US011562857B2

(12) United States Patent
Jo et al.

(10) Patent No.: US 11,562,857 B2
(45) Date of Patent: Jan. 24, 2023

(54) RELAXOR-FERROELECTRIC MATERIAL AND METHOD OF SYNTHESIZING THE SAME AND DEVICE INCLUDING RELAXOR-FERROELECTRIC MATERIAL

(71) Applicant: Samsung Electronics Co., Ltd., Suwon-si (KR)

(72) Inventors: Giyoung Jo, Suwon-si (KR); Hyeon Cheol Park, Hwaseong-si (KR); Daejin Yang, Seoul (KR); Doh Won Jung, Seoul (KR); Taewon Jeong, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 120 days.

(21) Appl. No.: 17/153,371

(22) Filed: Jan. 20, 2021

(65) Prior Publication Data

US 2022/0005647 A1 Jan. 6, 2022

(30) Foreign Application Priority Data

Jul. 1, 2020 (KR) .......................... 10-2020-0081070

(51) Int. Cl.
*H01G 4/12* (2006.01)
*H01G 4/08* (2006.01)
*H01G 4/30* (2006.01)

(52) U.S. Cl.
CPC ............. *H01G 4/08* (2013.01); *H01G 4/1218* (2013.01); *H01G 4/1227* (2013.01); *H01G 4/30* (2013.01)

(58) Field of Classification Search
None
See application file for complete search history.

(56) References Cited

U.S. PATENT DOCUMENTS 8,273,675 B2 * 9/2012 Zhang ................. C04B 35/4682
501/139
2007/0049486 A1 * 3/2007 Li ....................... C04B 35/6262
501/138

(Continued)

FOREIGN PATENT DOCUMENTS

JP 2007290940 A * 11/2007 ......... C04B 35/4682
KR 10-1990-0008558 3/1997

(Continued)

OTHER PUBLICATIONS

Jinyu Zhao, et al., "Effects of Bi2O3, Sm2O3 content on the structure, dielectric properties and dielectric tunability of BaTiO3 ceramics," Journal of Materials Science: Materials in Electronics, Published on Sep. 30, 2019.

(Continued)

*Primary Examiner* — Dion R. Ferguson
(74) *Attorney, Agent, or Firm* — Harness, Dickey & Pierce, P.L.C.

(57) ABSTRACT

A relaxor-ferroelectric material, a method of synthesizing the same and a device including the relaxor-ferroelectric material are provided. The relaxor-ferroelectric material includes a ferroelectric material having a first polarization characteristic. The ferroelectric material having the first polarization characteristics includes a plurality of regions having a second polarization characteristic and spaced apart from each other, and the first polarization characteristic and the second polarization characteristic are different from each other. The ferroelectric material having the first polarization characteristics and the plurality of regions have different response characteristics with respect to alternating current (AC) sweeping. The plurality of regions may include a solid solution.

22 Claims, 32 Drawing Sheets

(56) References Cited

U.S. PATENT DOCUMENTS

| | | | | |
|---|---|---|---|---|
| 2007/0254799 | A1* | 11/2007 | Kaneda | H01G 4/30 501/139 |
| 2009/0088315 | A1* | 4/2009 | Seki | C04B 35/486 501/139 |
| 2009/0310279 | A1* | 12/2009 | Sasabayashi | H01G 4/1227 361/321.4 |
| 2010/0081559 | A1* | 4/2010 | Zhang | C04B 35/6262 501/137 |
| 2011/0222205 | A1* | 9/2011 | Muraki | C01G 23/006 361/321.5 |
| 2016/0060174 | A1* | 3/2016 | Ino | C04B 35/4682 252/519.12 |
| 2022/0005647 | A1* | 1/2022 | Jo | H01G 7/06 |
| 2022/0028613 | A1* | 1/2022 | Jeong | H01L 28/60 |
| 2022/0123102 | A1* | 4/2022 | Jo | H01G 4/1254 |

FOREIGN PATENT DOCUMENTS

| | | | | |
|---|---|---|---|---|
| KR | 10-0212583 | B1 | 8/1999 | |
| KR | 20-0212583 | | 2/2001 | |
| KR | 20220052768 | A * | 4/2022 | |
| WO | WO-2008143160 | A1 * | 11/2008 | C01G 33/006 |

OTHER PUBLICATIONS

Zhengbo Shen, et al., "BaTiO3—BiYbO3 Perovskite Materials for Energy Storage Application," Journal of Materials Chemistry A, Published on Jul. 27, 2015.

M. Deluca, et al., "Remarkable impact of low BiYbO3 doping levels on the local structure and phase transitions of BaTiO3," Journal of Materials Chemistry A, Published on Mar. 15, 2018.

Gang Chen, et al., "Study on the structure and properties of (1-x) BiYbO3—xBaTiO3 ceramics synthesized by sol-gel method," Ferroelectrics;Taylor & Francis, vol. 507, pp. 127-138, 2017.

Gang Chen, et al., "Effects of sintering method and BiFeO3 dopant on the dielectric and ferroelectric properties of BaTiO3—BiYbO3 based solid solution ceramics," Elsevier; Ceramics International, Jun. 2018.

Leontin Padurariu, et al., "Field-dependent permittivity in nanostructured BaTiO3 ceramics:Modeling and experimental verification," Physical Review B 85;American Physical Society, Jun. 20, 2012.

Vincenzo Buscaglia, et al., "Size and scaling effects in barium titanate. An overview," Journal of the European Ceramic Society 40 (2020) 3744-3758, Jan. 15, 2020.

Daniel P. Shoemaker, et al., "Incoherent Bi off-centering in Bi2Ti2O6O0 and Bi2Ru2O6O0: Insulator versus metal," Jun. 9, 2011.

Monima Sarma, et al., "Exciplex: An Intermolecular Charge-Transfer Approach for TADF," Applied Materials & Interfaces, pp. 19279-19304, Published on Apr. 3, 2018.

* cited by examiner

RELAXOR-FERROELECTRIC MATERIAL AND METHOD OF SYNTHESIZING THE SAME AND DEVICE INCLUDING RELAXOR-FERROELECTRIC MATERIAL

CROSS-REFERENCE TO RELATED APPLICATION

This application claims the benefit of Korean Patent Application No. 10-2020-0081070, filed on Jul. 1, 2020, in the Korean Intellectual Property Office, the disclosure of which is incorporated herein in its entirety by reference.

BACKGROUND

1. Field

The present disclosure relates to ferroelectric materials, and more particularly, relaxor-ferroelectric materials and methods of synthesizing the same and devices including the relaxor-ferroelectric materials.

2. Description of Related Art

With the development of semiconductor technology, most electronic devices used in electronic devices are highly integrated and miniaturized. As a result, phenomena that weaken the characteristics of electronic devices may occur. For example, for a capacitor, the capacitance of the capacitor may be determined according to the permittivity of a dielectric used in the capacitor, the area of electrodes facing each other with the dielectric therebetween, and the distance between the electrodes based on a known formula. According to high integration and miniaturization, the electrode area of the capacitor narrows, the distance between the electrodes decreases, and the dielectric thickness decreases. As the electrode area of the capacitor narrows, the capacitance of the capacitor decreases. Even though the electronic devices are highly integrated and miniaturized, stable operations of the electronic devices need to be ensured. To this end, the capacitance of the capacitor must be sufficiently secured. As a method of stably securing the capacitance of the capacitor, various methods, such as using a dielectric of a high permittivity or stacking capacitors in a multi-layer structure, have been introduced.

SUMMARY

Provided are relaxor-ferroelectric materials capable of maintaining a ferroelectric characteristic even in a high integration and miniaturization environment.

Provided are methods of synthesizing the relaxor-ferroelectric materials.

Provided are devices including the relaxor-ferroelectric materials.

Additional aspects will be set forth in part in the description which follows and, in part, will be apparent from the description, or may be learned by practice of the presented example embodiments of the disclosure.

According to some example embodiments, a relaxor-ferroelectric material includes a ferroelectric material having a first polarization characteristic; and a plurality of regions spaced apart from each other, the plurality of regions having a second polarization characteristic different from the first polarization characteristic.

The ferroelectric material having the first polarization characteristic and the plurality of regions may have different response characteristics with respect to alternating current (AC) sweeping. The plurality of regions may include a solid solution. Each of the plurality of regions may include a donor and an acceptor. Only the second polarization characteristic may appear under a direct current (DC) high electric field. Only the plurality of regions may respond to AC sweeping under the high DC electric field. Accordingly, the relaxor-ferroelectric materials may include a polarization characteristic following the AC sweeping. The ferroelectric material having the first polarization characteristic may include a plurality of domains each including a region of the plurality of regions having the second polarization characteristic. A concentration of the solid solution may be about 5 mol % to about 20 mol % and/or about 5 mol % to about 10 mol %. The plurality of regions may include a material having a chemical equation of $ABO_3$, and an ion radius of A may be greater than an ion radius of B. An amount of A and an amount of B may be the same in the plurality of regions. A may be at least one of Bi and La and B may be a lanthanide element.

According to some example embodiments, a method of synthesizing of relaxor-ferroelectric materials includes quantifying a first raw material comprising a composition of the relaxor-ferroelectric material having a first polarization characteristic in the relaxor-ferroelectric material; quantifying a second raw material comprising a composition of a material that has a second polarization characteristic different from the first polarization characteristic in the relaxor-ferroelectric material; mixing the first raw material and the second raw material; and performing a processing according to a solid-state reaction.

The material having the second polarization characteristic may be a solid solution in the relaxor-ferroelectric material. A solid solution concentration is about 5 mol % to about 20 mol % in the relaxor-ferroelectric material. The material having the second polarization characteristic may include a substitute composition having a chemical equation of $ABO_3$, and an ion radius of A may be greater than an ion radius of B in the chemical equation. An amount of A and an amount of B may be the same. The second raw material may include A as $A_2O_3$ and B as $B_2O_3$. A may be at least one Bi and La and B may be a lanthanide element.

According to some example embodiments, a capacitor includes a first electrode; a second electrode facing the first electrode; and a dielectric layer include the relaxor-ferroelectric material according to an embodiment between the first electrode and the second electrode, When the first electrode, the dielectric layer, and the second electrode are sequentially stacked, the dielectric layer and the second electrode may be alternately stacked on the first electrode.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1A:
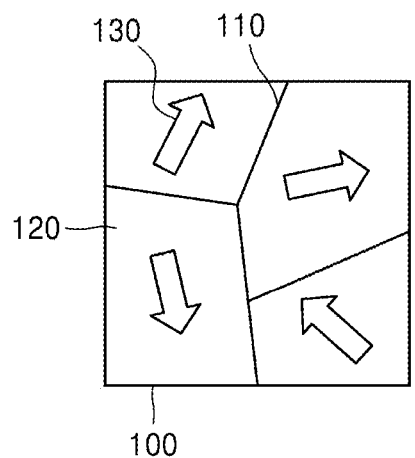
FIGS. 1A to 1C are conceptual diagrams illustrating a case in which permittivity decreases due to a spontaneous polarization fixed in a conventional thin film ferroelectric under a high direct current (DC) voltage (under a high electric field)

Reference will now be made in detail to some example embodiments, some of which are illustrated in the accompanying drawings, wherein like reference numerals refer to like elements throughout. In this regard, the present embodiments may have different forms and should not be construed as being limited to the descriptions set forth herein. Accordingly, some example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

When the terms "about" or "substantially" are used in this specification in connection with a numerical value, it is intended that the associated numerical value includes a manufacturing tolerance (e.g., ±10%) around the stated numerical value. Moreover, when the words "generally" and "substantially" are used in connection with geometric shapes and/or configurations, it is intended that precision of the geometric shape and/or configuration is not required but that latitude for the shape and/or configuration is within the scope of the disclosure. Further, regardless of whether numerical values, shapes, and/or configurations are modified as "about" or "substantially," it will be understood that these values and shapes should be construed as including a manufacturing or operational tolerance (e.g., ±10%) around the stated numerical values, shape, and/or configurations.

Although the shape of an electronic device may differ depending on the electronic device, most electronic devices include capacitors. As electronic devices are highly integrated and miniaturized, capacitors are also miniaturized, and various methods of securing a stable capacitance are used, such as using a dielectric of a high permittivity and/or vertically stacking a plurality of capacitors.

In the case of a multi-layer ceramic capacitor (MLCC), $BaTiO_3$ (BTO) which is a ferroelectric of high permittivity may be used as a dielectric layer in order to secure a stable capacitance.

The crystal structure of BTO is a tetragonal structure at room temperature and has a spontaneous polarization due to the off-centering effect in the c-axis direction of titanium ions ($Ti^{4+}$) elongated in the c-axis compared to the a-axis and the b-axis and located in the B-site. BTO is a ferroelectric of which the permittivity is expressed due to the spontaneous polarization. As the thickness of BTO decreases according to high integration and miniaturization, the ferroelectric characteristic of the BTO is weakened. One of the reasons for that is that BTO is under a high electric field when a high DC voltage is applied to the thin BTO. When BTO is under the high electric field, because the polarization direction of BTO may be fixed, BTO may not respond even when an alternating current (AC) voltage is applied to BTO. For example, a fixed polarization does not respond to AC sweeping. As a result, the permittivity of BTO under the high electric field rapidly decreases due to voltage fixation.

Figure 1B:
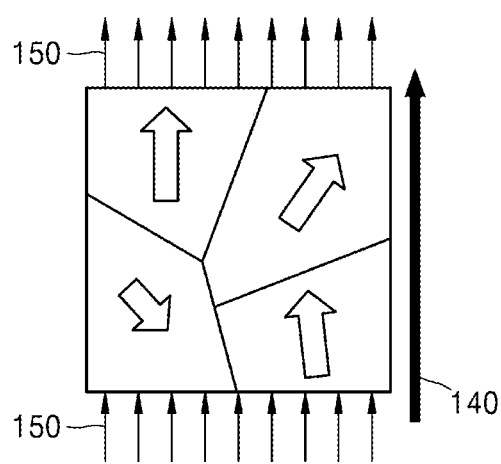
Figure 1C:
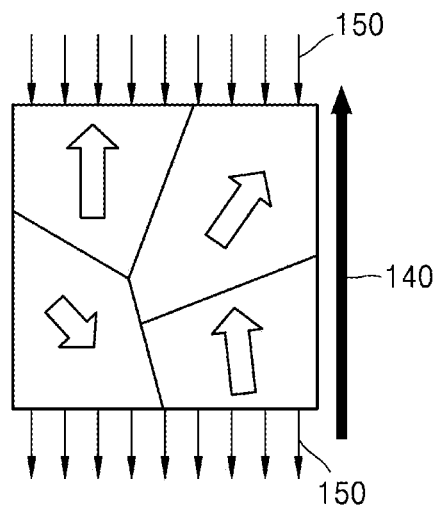

FIGS. 1A to 1C are brief diagrams showing this phenomenon.

In FIGS. 1A to 1C, a ferroelectric 100, such as BTO, may have a thickness reduced to several hundred nanometers according to the requirements of the high integration and miniaturization. Each domain 120 of the ferroelectric 100 may have a polarization 130 and a boundary 110 between the domains 120. When no electric field is applied to the ferroelectric 100, the polarization 130 of each domain 120 is in an arbitrary direction as shown in FIG. 1A. However, when a high direct current (DC) voltage, e.g., a DC bias 140, is applied to the ferroelectric 100, the ferroelectric 100 is placed under a high electric field. Accordingly, the polarization 130 of each domain 120 of the ferroelectric 100 is generally aligned in the same direction as the DC bias 140, such that the ferroelectric 100 exhibits a generalized polarization in the same direction as the DC bias 140. Thereafter, as shown in FIG. 1C, even when the direction of an AC bias 150 changes to the opposite direction to the DC bias 140, in a state that the DC bias 140 is applied to the ferroelectric 100, the direction of the polarization 130 of each domain 120 does not change, and remains in the same direction as the DC bias 140. As described above, after the polarization 130 of the ferroelectric 100 is fixed in the direction of the DC bias 140, the polarization 130 does not respond to the change of the AC bias 150. Accordingly, the permittivity of the ferroelectric 100 is rapidly reduced. As a result, the ferroelectric 100 may not function as a dielectric.

Another reason why the ferroelectric characteristic of BTO may weakened as the thickness of BTO decreases according to high integration and miniaturization is that tetragonality decreases as grain size decreases, and accordingly, permittivity may decrease.

For example, a dielectric material, such as BTO, may be designed to include a given number (e.g., 5 to 7) of grains per dielectric layer to ensure the device reliability. When the grain size included in the dielectric layer is reduced to the size of several tens to several hundred nanometers, the dielectric material, such as BTO, may be in a more stable energy state in a cubic structure than in a tetragonal structure. As a result, when the thickness of the dielectric layer decreases according to high integration and miniaturization, the tetragonality may decrease in the dielectric material, and the cubic characteristic may appear, and thus, the permittivity of the dielectric layer may decrease.

Considering these points, a next-generation dielectric with a new mechanism that operates effectively under a high electric field as a means of mitigating and/or preventing the deterioration of the ferroelectric characteristic (e.g., the decrease in the permittivity) that may appear in a ferroelectric, such as BTO, when subject to the conditions associated with high integration and miniaturization is introduced below. The next-generation dielectric material to be introduced may be a ferroelectric material, for example, a ferroelectric material based on BTO, but is not limited to BTO. The introduced dielectric material may be used, for example, in a dielectric layer.

The next-generation dielectric material introduced below may be a ceramic ferroelectric material capable of exhibiting a permittivity higher than the BTO of the related art even in a high electric field by a high DC voltage application. For example, the next-generation dielectric material may include a ferroelectric material including a special solid solution based on BTO and/or may include a ferroelectric material with a permittivity equal to the BTO, but wherein the polarization characteristics of some regions of the ferroelectric material are different from those of BTO and the polarization characteristics of the other regions are the same as those of BTO. The above ferroelectric material may include a part having a low AC sweeping energy barrier. Due to the part having the low AC sweeping energy barrier, the above ferroelectric material may respond to AC sweeping even under the high electric field. Accordingly, under the high electric field, the above ferroelectric material may exhibit a permittivity higher than the BTO of the related art. That is, the ferroelectric material introduced below may maintain the dielectric characteristics even under the high electric field. The ferroelectric material to be described below may be referred to as a relaxor-ferroelectric material.

Hereinafter, a relaxor-ferroelectric material, a method of manufacturing the same, and a device including the relaxor-ferroelectric material according to some example embodiments will be described in detail with reference to the accompanying drawings. In this process, the thicknesses of layers or regions shown in the drawings may be exaggerated somewhat for clarity of the specification. The embodiments described below are merely examples, and various modifications are possible from these embodiments. In addition, in a layer structure described below, an expression "above" or "on" may include not only "immediately on in a contact manner" but also "on in a non-contact manner". The electronic device may include a semiconductor device. In the following description, the same reference numerals in each drawing indicate the same member.

Figure 2A:
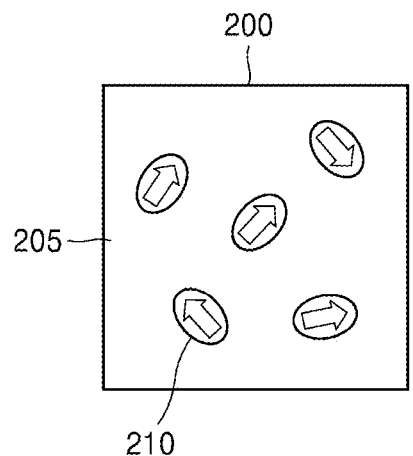
FIGS. 2A to 2C are conceptual diagrams illustrating a case in which a relaxor-ferroelectric material exhibits a high permittivity even under a high electric field due to a polar nanoregion (PNR) included in the relaxor-ferroelectric material according to some example embodiment.
Figure 2B:
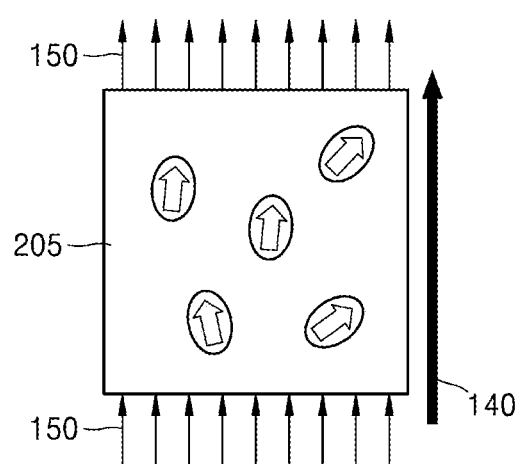
Figure 2C:
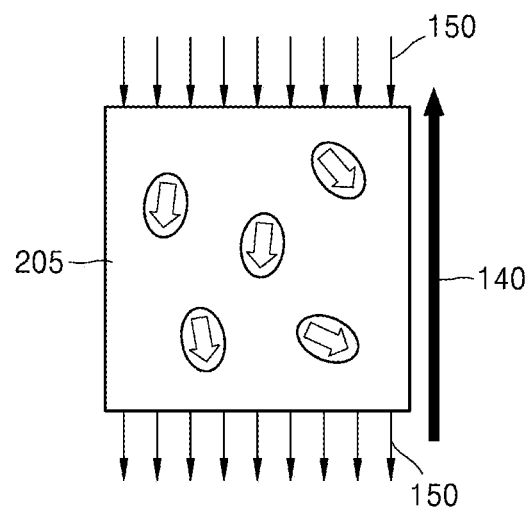

FIGS. 2A to 2C are conceptual diagrams illustrating a process in which a relaxor-ferroelectric material 200 according to an example embodiment responds well to the AC bias 150 even under the high DC bias 140.

Referring to FIGS. 2A to 2C, the relaxor-ferroelectric material 200 according to an example embodiment includes a ferroelectric material 205 exhibiting a first polarization characteristics and a polar nanoregion 210 (PNR) included in the ferroelectric material 205 and exhibiting a second polarization characteristics. The first polarization characteristics and the second polarization characteristics may be different from each other. The first polarization characteristics and the second polarization characteristics may include spontaneous polarization characteristics. The relaxor-ferroelectric material 200 may be expressed as a relaxor-ferroelectric material layer. The polar nanoregion 210 may be expressed as a polar layer or a polar portion. The ferroelectric material 205 may be expressed as a ferroelectric material layer. When applied in an electronic device (e.g., a capacitor) the thickness of the ferroelectric material 205 may be several hundred nanometers, for example, 1000 nm or less. In an example, the ferroelectric material 205 may be BTO or a BTO layer, but is not limited thereto. The polar nanoregion 210 may be a region including a solid solution. The solid solution may include a material different from the ferroelectric material 205. When the ferroelectric material 205 is BTO, the crystal structure of the relaxor-ferroelectric material 200 including the polar nanoregion 210 may be wholly a pseudo-cubic structure, and may not have peaks corresponding to (002) and (004) crystal faces in the X-ray diffraction characteristic. In the relaxor-ferroelectric material 200, a concentration of the solid solution may be about 5 mol % to about 20 mol % in an example, and/or about 5 mol % to about 10 mol %. For example, the polar nanoregion 210 may be a region in which a major element is substituted with another element in a region and/or part of the ferroelectric material 205. For example, when the ferroelectric material 205 is BTO, the polar nanoregion 210 may be a region formed by a defect cluster in which Ba in the A-site of BTO is substituted with a first element different from Ba, and Ti in the B-site is substituted with a second element different from Ti, which may be a polar nanoregion (PNR). The first element may be an element serving as a donor, and the second element may be an element serving as an acceptor. The first element and the second element may have different ionic radii. In an example, the ion radius of the first element may be greater than the ion radius of the second element. In the relaxor-ferroelectric material 200, the amount of the first element may be the same as the amount of the second element. In an example, the first element may be lanthanum (La) and/or bismuth (Bi), but is not limited thereto. An element that has physicochemical characteristics similar to lanthanum (La) or bismuth (Bi) and that may be used as the donor may be used as the first element. In an example, the second element may include a rare earth element, but is not limited thereto. An element that may be used as the acceptor in correspondence to the donor may be used as the second element. In an example, the rare earth element may include at least one of cerium (Ce), promethium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and/or lutetium (Lu). In an example, the first and second elements may be elements of oxidation number +3. In another example, the first element may be an element of oxidation number +1, and the second element may be an element of oxidation number +5.

As described above, because the material of the polar nanoregion 210 is different from the ferroelectric material 205, the first polarization characteristic of the ferroelectric material 205 may be different from the second polarization characteristic of the polar nanoregion 210. Accordingly, the energy barrier of the ferroelectric material 205 and the energy barrier of the polar nanoregion 210 in response to the AC sweeping 150 may be different from each other. In an example, the energy barrier of the polar region 210 in response to the AC sweeping 150 may be lower than that of the ferroelectric material 205.

For this reason, as shown in FIGS. 2B and 2C, when the relaxor-ferroelectric material 200 is under the high DC bias 140, the total polarization of the ferroelectric material 205 is fixed in the direction of the DC bias 140 like the ferroelectric 100 of FIG. 1 due to the high electric field caused by the DC bias 140 and does not respond to the AC bias 150 applied to the relaxor-ferroelectric material 200, but the polar nanoregion 210 may directly respond to the AC bias 150, and thus, the polarization direction of the polar nanoregion 210 may change in response to the AC bias 150. By such characteristics, the relaxor-ferroelectric material 200 may exhibit a high permittivity even under a high electric field caused by a high DC voltage.

In the relaxor-ferroelectric material 200 of FIGS. 2A to 2C, the ferroelectric material 205 also includes a plurality of domains like the ferroelectric 100 of FIG. 1, although not illustrated for convenience. Each domain included in the ferroelectric material 205 may include a plurality of polar nanoregions 210. The polarization characteristics of regions other than the polar nanoregion 210 in each domain may be different from that of the polar nanoregion 210.

Figure 3:
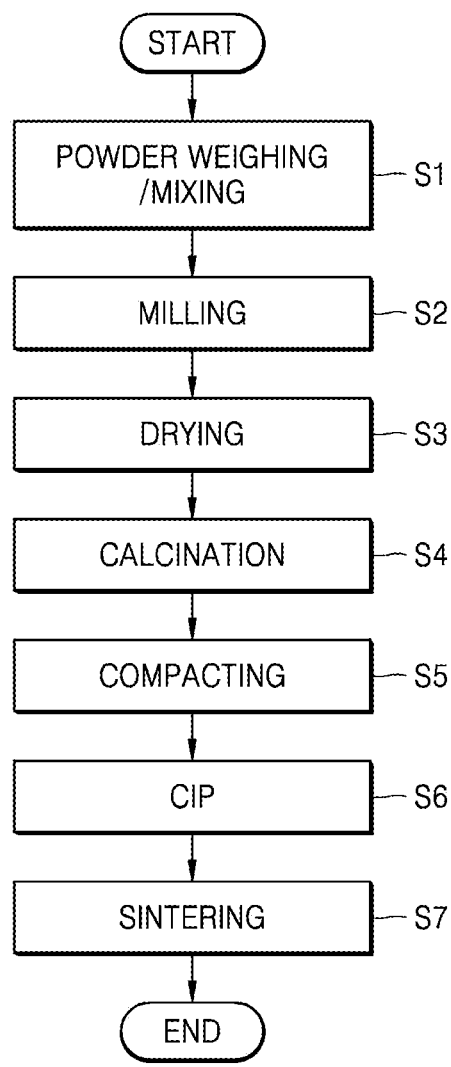
FIG. 3 is a diagram showing a method of synthesizing a relaxor-ferroelectric material, according to some example embodiment.

FIG. 3 is a diagram showing a method of synthesizing a relaxor-ferroelectric material for each operation, according to an example embodiment, and shows a synthesis order using a solid-state reaction.

Referring to FIG. 3, the method of synthesizing the relaxor-ferroelectric material may include a powder weighing/mixing operation (S1), a milling operation (S2), a drying operation (S3), a calcination operation (S4), a compacting operation (S5), a cold isostatic press (CIP) operation (S6), and a sintering operation (S7). For example, the relaxor-ferroelectric material may be synthesized based on BTO, and may have a composition of $(1-X)BaTiO_3—(X)BiREO_3$, wherein X may represent a molar percentage of the $BiREO_3$ in the relaxor-ferroelectric material of the polar nanoregions. In the above composition, "RE" stands for rare earth. For example, a lanthanide element may be located in the place of "RE." The synthesizing method may be performed considering the solid solution concentration of the final obtained result. For example, the synthesizing method, as described below, may include weighing the powder precursors such that the stoichiometric composition of the relaxor-ferroelectric material may be about 5 mol % to about 20 mol % or about 5 mol % to about 10 mol % the relaxor-ferroelectric material. In an example, the synthesizing method may be performed such that X is 0.05 to 0.2. In an example embodiment, the synthesizing method may be performed such that X is 0.05 to 0.1.

In the powder weighing/mixing operation (S1), a raw material or a precursor including each composition of the relaxor-ferroelectric material may be quantified and/or mixed according to a molar ratio. The mixing ratio may be determined considering the composition of the relaxor-ferroelectric material to be finally obtained. For example, the amounts of the raw materials or precursors may be stoichiometrically controlled to obtain the relaxor-ferroelectric material described above. In an example embodiment of the powder weighing/mixing operation (S1), $BaCO_3$ may be used as a raw material for Ba, $TiO_2$ may be used as a raw material for Ti, and $Bi_2O_3$ is used as a raw material for Bi. $RE_2O_3$ may be used as a raw material for the RE. The raw materials to be weighed and mixed may vary depending on the type of the relaxor-ferroelectric material.

The weighed and mixed raw materials are more uniformly mixed and milled in the milling operation (S2). The milling operation (S2) may include mechanical milling the mixture and be performed using a ball milling, for example, a planetary milling. The milling operation (S2) may also include airjet-milling, bead milling, roll-milling, planetary milling, hand milling, high-energy ball milling, planetary mill ball milling, stirred ball milling, vibrating milling, mechanofusion milling, shaker milling, attritor milling, disk milling, shape milling, conical screw milling, high-speed mixing, and/or a combination thereof. The milling in the milling operation (S2) may be, for example, a wet milling using a liquid diluent, such as an alcohol. In another example embodiment, the milling may include dry milling. In an example embodiment, the milling operation (S2) may be performed for about 12 hours.

When the milling is a wet milling, a resultant obtained in the milling operation (S2) is dried in the drying operation (S3). The liquid diluent used in the milling operation (S2) may be completely removed through the drying operation (S3).

A volatile component may be removed from the dried mixture through heating in the calcination operation (S4), and thus, the purity of the material may increase. Reaction gases may be generated and expelled from the mixture near the calcination temperature. The resultant obtained in the calcination operation (S4) may be maintained at or near the calcination temperature for a certain period of time to prevent stress and crack of the material due to the reaction gas. The calcination operation (S4) may be performed at a temperature below the melting point of a target material. Through the calcination operation (S4), the purity of a ceramic material of the relaxor-ferroelectric material may increase and the solid-state reaction may be promoted. In an example, the calcination operation (S4) may be performed for about 10 hours in an ambient air atmosphere and at 900° C.

The compacting operation (S5) may include molding the calcined resultant obtained through the calcination operation (S4) into a shape. In the compacting operation (S5), the outer shape of the relaxor-ferroelectric material may be formed.

The CIP operation (S6) may include pressing and molding the compacted resultant obtained in the compacting operation (S5) by applying a high pressure evenly to the surface of the resultant molded through the compacting operation (S5). In an example embodiment, a pressure of about 200 MPa or more may be applied in the CIP operation (S6).

The sintering operation (S7) may include baking the resultant obtained through the CIP operation (S6) at a high temperature. For example, in the sintering operation (S7), sintering may be performed in an air atmosphere and at 1250° C. to 1500° C. for about 5 hours.

Through this synthesizing method, various relaxor-ferroelectric materials of different solid solution concentrations may be synthesized, and the synthesized relaxor-ferroelectric materials may be fully dense with a relative density of 99% or more compared to, for example, perfectly crystalline BTO and/or an ideally imperfect relaxer-ferroelectric material as described above, at room temperature. Because the synthesized relaxor-ferroelectric materials may be obtained in the form of a layer, the synthesizing method of FIG. 3 may be a method of forming a relaxor-ferroelectric layer and/or a relaxor-ferroelectric material layer.

X-ray diffraction (XRD) qualitative analysis may be performed to observe and/or confirm the pseudo-cubic of the relaxor-ferroelectric material obtained through the synthesizing method of FIG. 3. In addition, the P-E characteristic, the permittivity characteristics under a high electric field (e.g., 87 kV/cm), and the temperature stability, etc. may be measured with respect to the relaxor-ferroelectric material obtained through the synthesizing method. In order to measure the temperature stability, a temperature coefficient of capacitance (TCC) may be measured at, for example, incremental degrees between −55° C. to 200° C. These measured results may be with the BTO of the related art.

FIGS. 4 to 30 show these comparison results between some example embodiments and some BTO examples.

Figure 4:
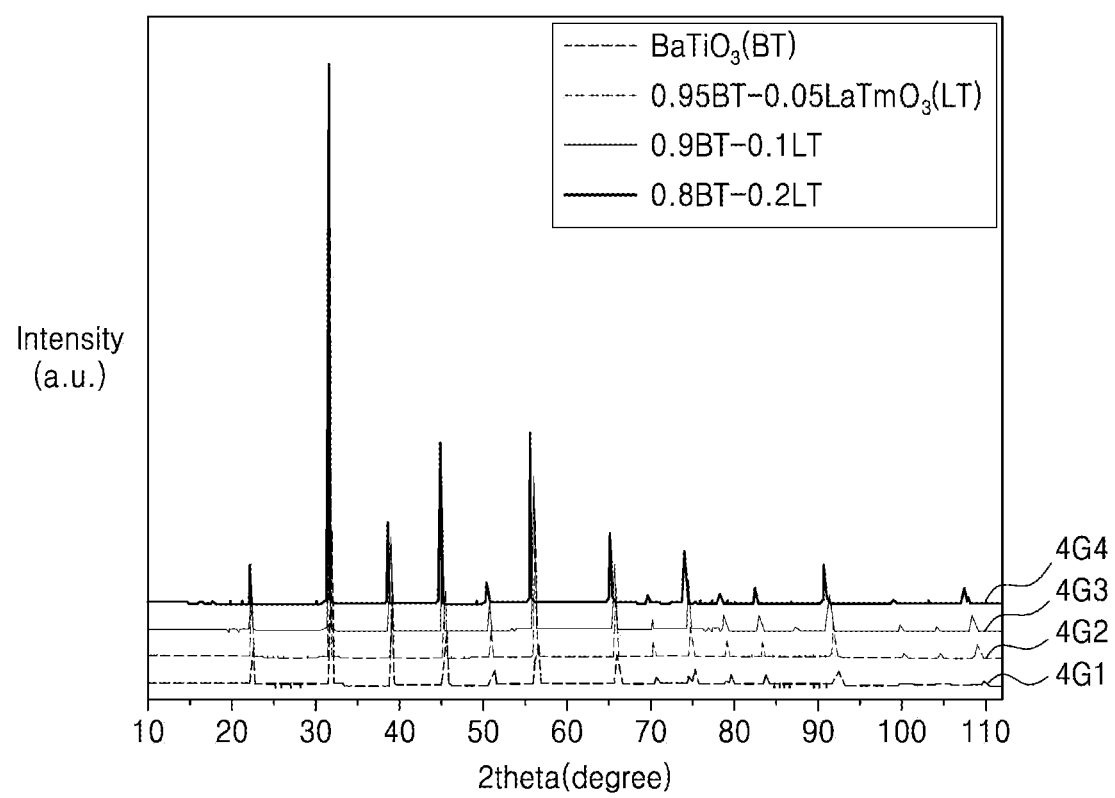
FIGS. 4 to 6 are graphs showing X-ray diffraction (XRD) analysis results for comparing and analyzing physical characteristics of a first relaxor-ferroelectric material synthesized according to the synthesizing method of FIG. 3 and the ferroelectric material of the related art.
Figure 5:
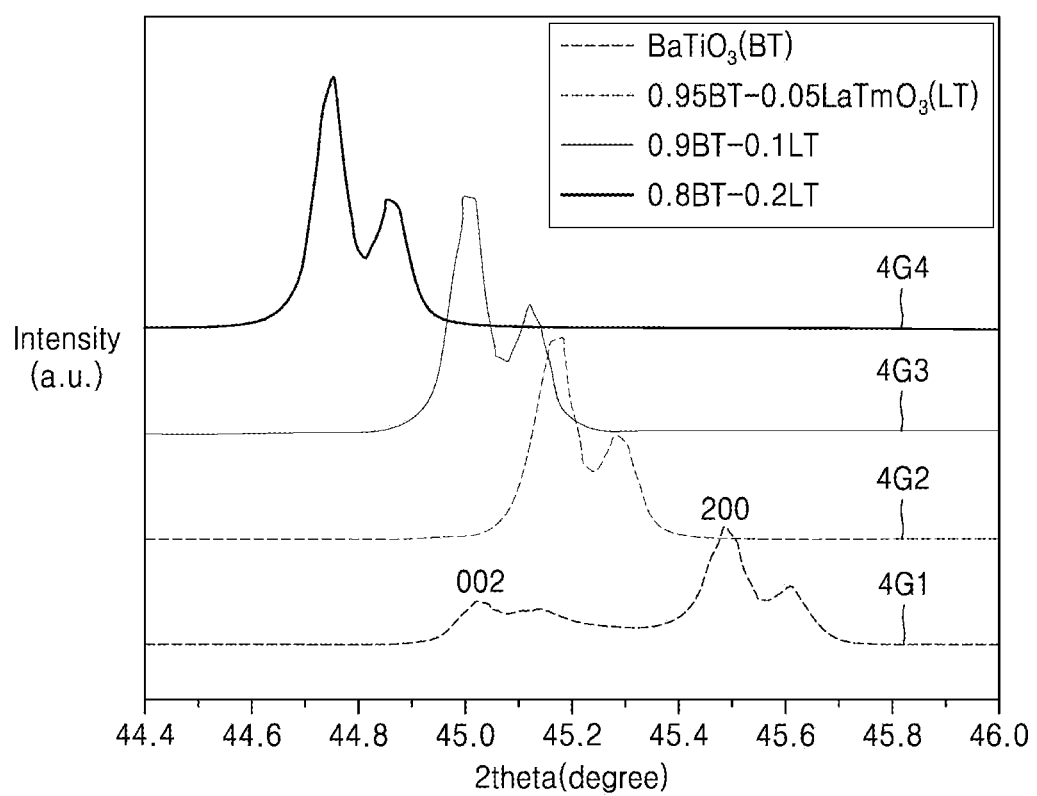
Figure 6:
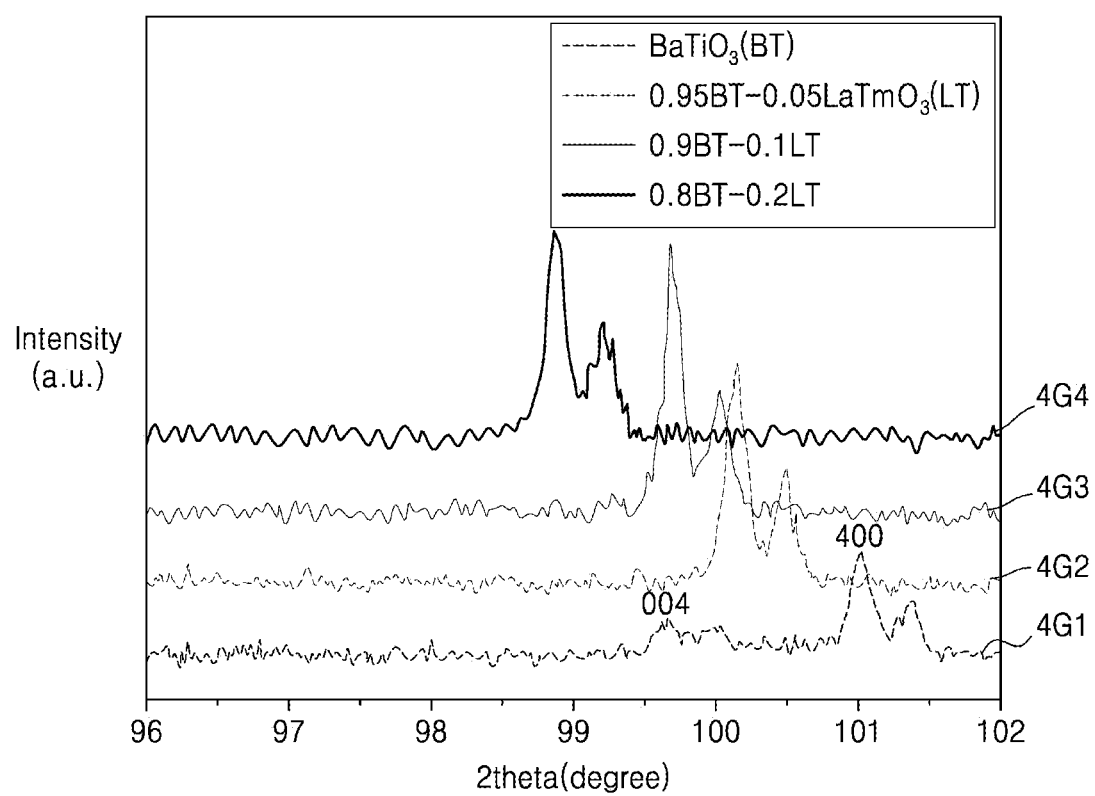

FIGS. 4 to 6 are diagrams showing XRD analysis results of a first relaxor-ferroelectric material synthesized through the synthesizing method of FIG. 3 and the BTO of the related art. FIG. 5 is a diagram showing only a part corresponding to a range of a relatively low angle in FIG. 4, and FIG. 6 is a diagram showing only a part corresponding to a range of a relatively high angle in FIG. 4. The first relaxor-ferroelectric material may be a relaxor-ferroelectric material in which the A-site of BTO is substituted by La (ion radius of 1.36 Å) and the B-site of BTO is substituted by Tm in a solid solution region and/or a polar nanoregion. In this first relaxor-ferroelectric material a donor is La and an acceptor is Tm). Accordingly, the first relaxor-ferroelectric material may have a composition of $(1-X)BaTiO_3$—$(X)LaTmO_3$.

In FIG. 4, a first graph 4G1 shows the XRD results of the BTO of the related art. A second graph 4G2 shows the XRD results of a solid solution concentration of the first relaxor-ferroelectric material at about 5 mol % (e.g., about $0.95BaTiO_3$-$0.05LaTmO_3$ (0.95BT-0.05LT)). A third graph 4G3 shows the XRD result of a solid solution concentration of the first relaxor-ferroelectric material at about 10 mol % (e.g., about 0.9BT-0.1 LT). A fourth graph 4G4 shows the XRD result of solid solution concentration of the first relaxor-ferroelectric material at about 20 mol % (e.g., about 0.8BT-0.2LT).

Upon comparing the first to fourth graphs 4G1 to 4G4 of FIG. 4, it may be seen that the diffraction peak of the first relaxor-ferroelectric material and the diffraction peak of BTO are generally consistent as a whole regardless of the solid solution concentration of the first relaxor-ferroelectric material.

However, referring to FIG. 5, a (002) peak, which indicates a crystal face of (002), appears in the first graph 4G1 in a low angle region but does not appear in the second to fourth graphs 4G2 to 4G4.

Similarly, referring to FIG. 6, a peak (004), which indicates a crystal face of (004), appears in the first graph 4G1 in a high angle region but does not appear in the second to fourth graphs 4G2 to 4G4.

These results in FIGS. 5 and 6 suggest that the crystal structure of BTO having no solid solution is a tetragonal structure and that the crystal structure of the first relaxor-ferroelectric material having the solid solution changes from the tetragonal structure to a cubic structure.

Figure 7:
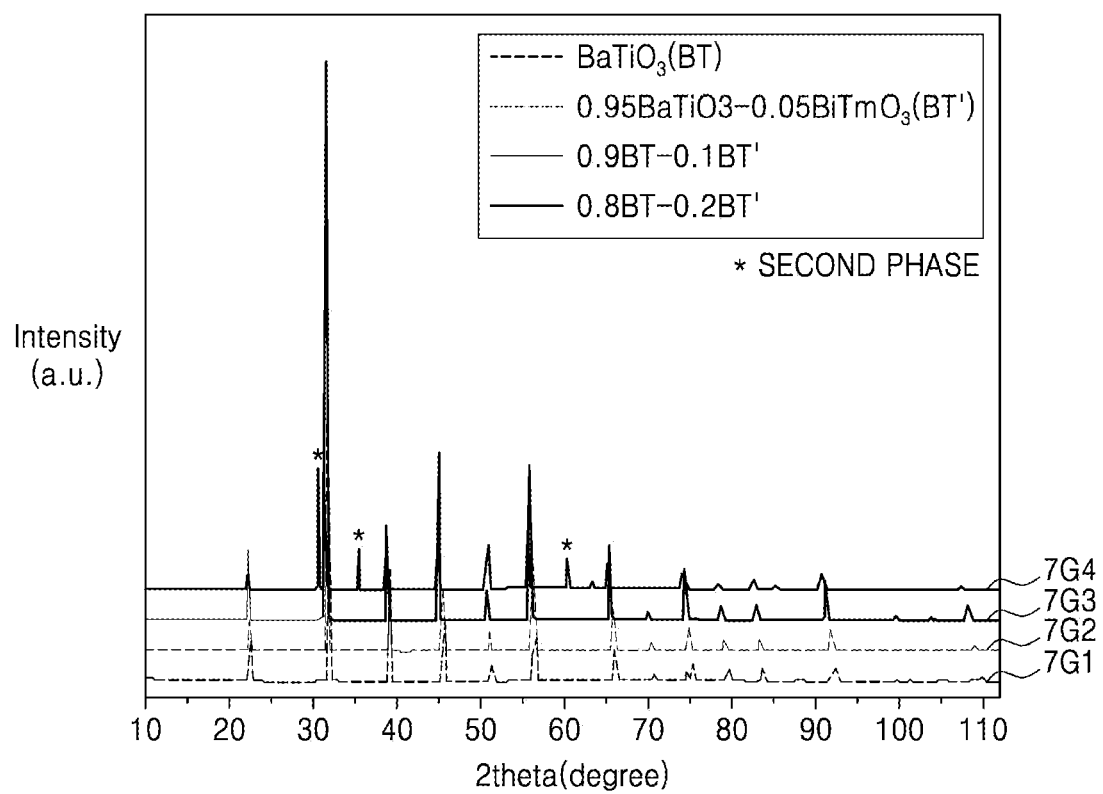
FIGS. 7 to 9 are graphs showing XRD analysis results for comparing and analyzing physical characteristics of a second relaxor-ferroelectric material synthesized according to the synthesizing method of FIG. 3 and the ferroelectric material of the related art.
Figure 8:
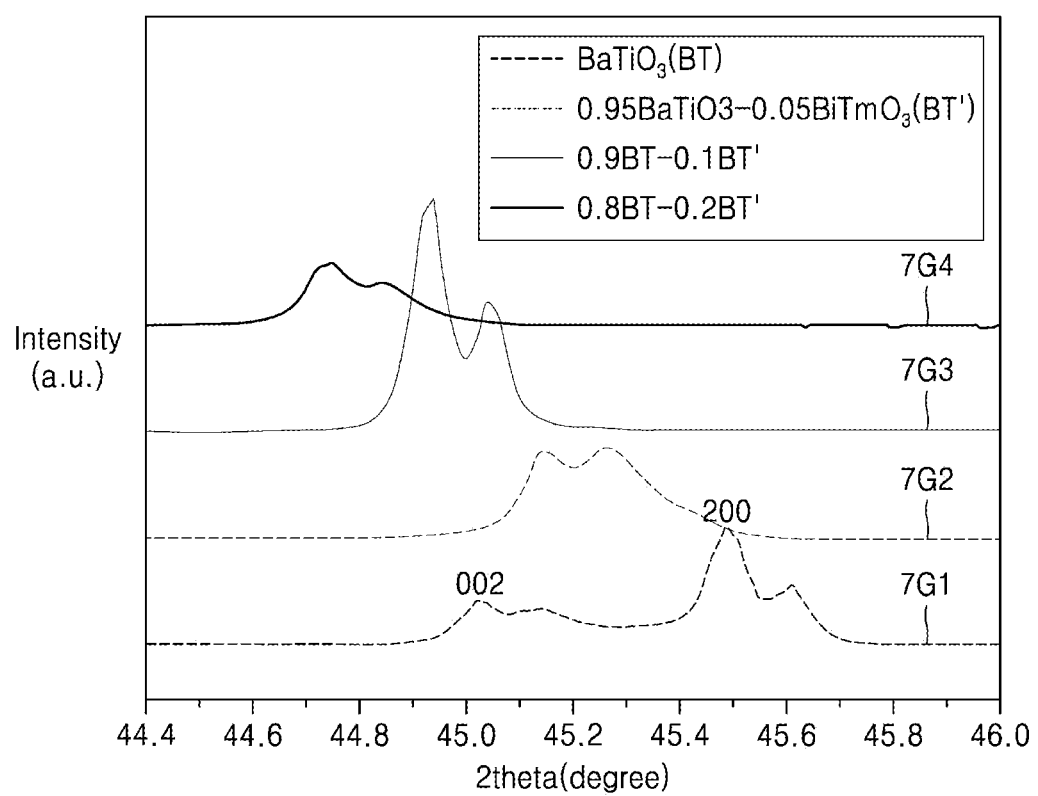
Figure 9:
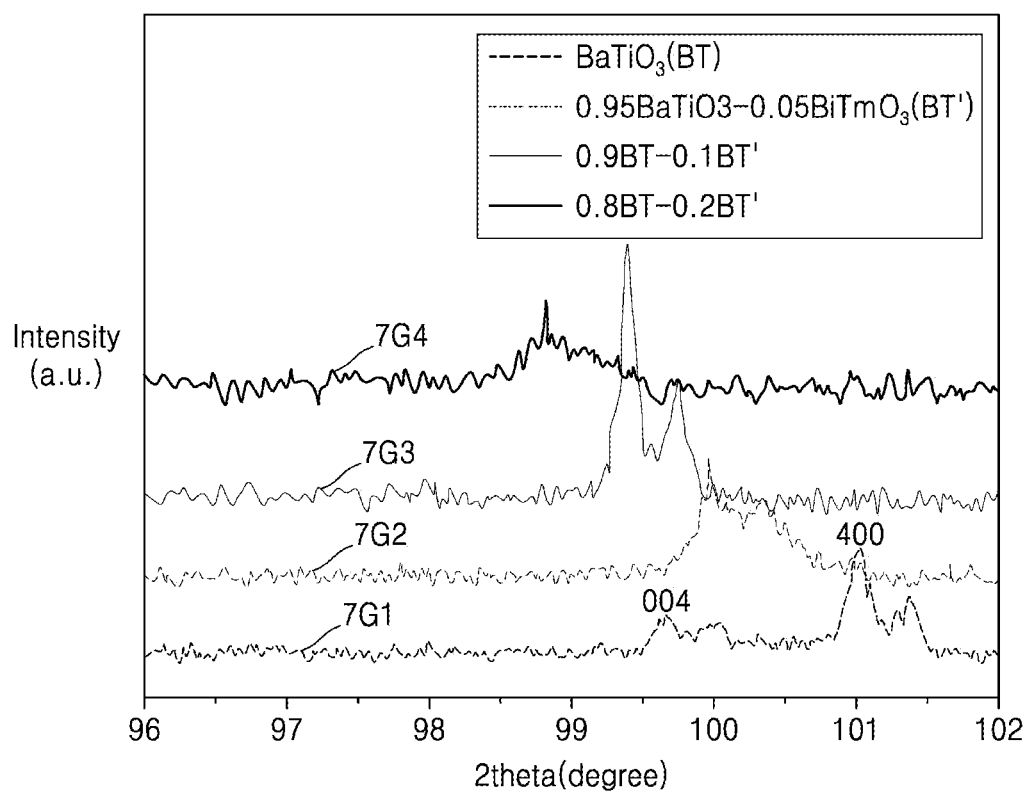

FIGS. 7 to 9 are diagrams showing XRD analysis results of a second relaxor-ferroelectric material synthesized through the synthesizing method of FIG. 3 and the BTO of the related art. FIG. 8 is a diagram showing only a part corresponding to a range of a relatively low angle in FIG. 7, and FIG. 9 is a diagram showing only a part corresponding to a range of a relatively high angle in FIG. 7. The second relaxor-ferroelectric material may be a relaxor-ferroelectric material in which the A-site of BTO is substituted by Bi with the same ion radius as that of La and the B-site is substituted by Tm in a solid solution region and/or a polar nanoregion, wherein a donor is Bi and an acceptor is Tm. Accordingly, the second relaxor-ferroelectric material may have a composition of $(1-X)BaTiO_3$—$(X)BiTmO_3$.

In FIG. 7, a first graph 7G1 shows the result of the BTO of the related art. A second graph 7G2 shows the XRD result of a solid solution concentration of the second relaxor-ferroelectric material at about 5 mol % (e.g., about $0.95BaTiO_3$-$0.05BiTmO_3$(0.95BT-0.05BT')). A third graph 7G3 shows the XRD result of a solid solution concentration of the second relaxor-ferroelectric material at about 10 mol % (e.g., about 0.9BT-0.1BT'). A fourth graph 7G4 shows the XRD result of a solid solution concentration of the second relaxor-ferroelectric material at about 20 mol % (e.g., about 0.8BT-0.2BT').

Upon comparing the first to fourth graphs 7G1 to 7G4 of FIG. 7, it may be seen that the diffraction peak of the second relaxor-ferroelectric material and the diffraction peak of BTO are generally consistent throughout, except for the solid solution concentration at about 20 mol % (the fourth graph 7G4). The peaks indicated by an asterisk (*) in the fourth graph 7G4 suggest that the second relaxor-ferroelectric material has a second phase. Although the solid solution of the second relaxor-ferroelectric material is that A-site of BTO is substituted with Bi having the same ion radius as La, what the second phase appears as shown in the fourth graph 7G4 suggests that a relatively larger crystallographic mutation appears in the second relaxor-ferroelectric material when Bi is present in the A-site than when La is present in the A-site due to the lone-pair electron characteristic of Bi. As a result, the fourth graph 7G4 suggests that the limit of solid solution concentration of the second relaxor-ferroelectric material is about 20 mol % or less.

Referring to FIG. 8, the (002) peak appears in the first graph 7G1 in a low angle region. However, the (002) peak does not appear in the second to fourth graphs 7G2 to 7G4.

Referring to FIG. 9, the peak (004) appears in the first graph 7G1 in a high angle region. However, the (004) peak does not appear in the second to fourth graphs 7G2 to 7G4.

These results in FIGS. 8 and 9 suggest that the crystal structure of BTO having no solid solution is a tetragonal structure and that the crystal structure of the second relaxor-ferroelectric material having the solid solution changes from the tetragonal structure to a cubic structure.

Figure 10:
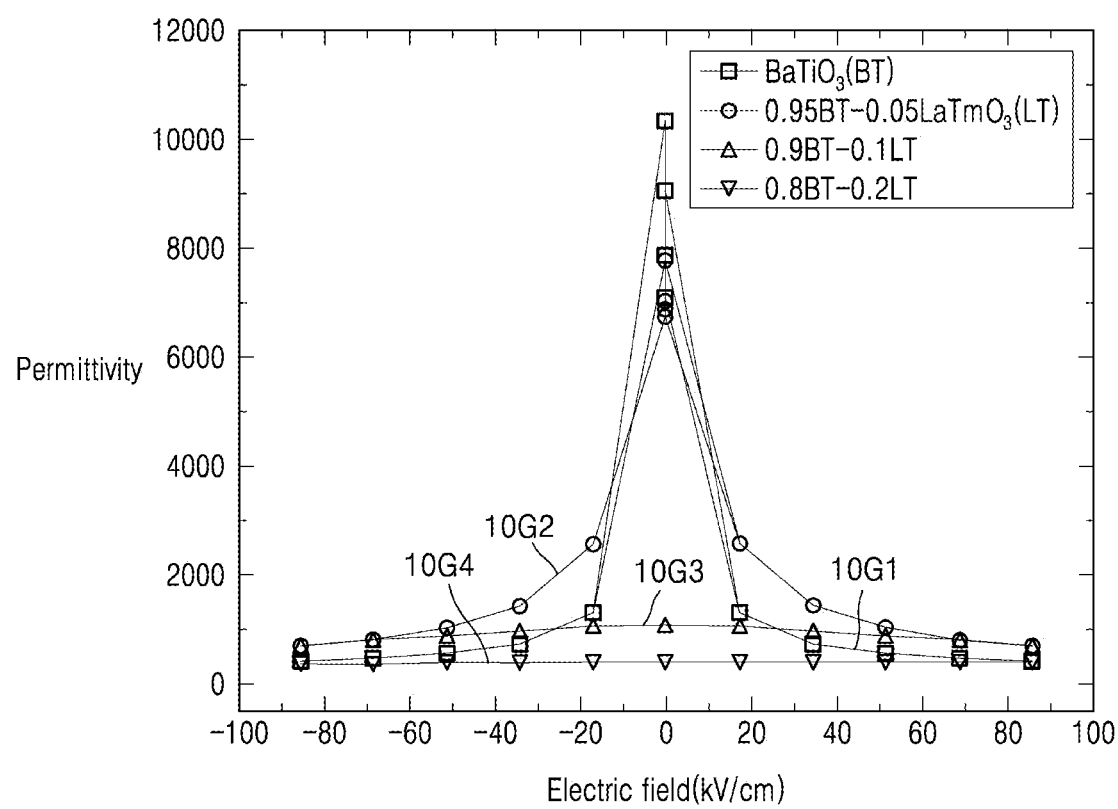
FIG. 10 is a graph showing permittivity-electric field characteristics of the first relaxor-ferroelectric material used to obtain the XRD analysis result of FIG. 4 and the ferroelectric material of the related art.

FIG. 10 is a graph showing permittivity-electric field characteristics of a first relaxor-ferroelectric materials used to obtain the XRD analysis result of FIG. 4 and the conventional ferroelectric material. In FIG. 10, the horizontal axis represents the electric field, and the vertical axis represents the permittivity.

In FIG. 10, a first graph 10G1 shows a change in the permittivity of BTO which represents the conventional ferroelectric material, when the electric field changes between −87 kV/cm and +87 kV/cm. A second graph 10G2 shows a change in the permittivity when the electric field changes between −87 kV/cm and +87 kV/cm, and the solid solution concentration of the first relaxor-ferroelectric material is about 5 mol %. A third graph 10G3 shows a change in the permittivity when the electric field changes between −87 kV/cm and +87 kV/cm, and the solid solution concentration of the first relaxor-ferroelectric material is about 10 mol %. A fourth graph 10G4 shows a change in the permittivity when the electric field changes between −87 kV/cm and +87 kV/cm, and the solid solution concentration of the first relaxor-ferroelectric material is about 20 mol %.

Upon comparing the first to fourth graphs 10G1 to 10G4 of FIG. 10, it may be seen in the case of BTO (the first graph 10G1) that the permittivity rapidly decreases as the electric field increases from 0 to 87 kV/cm. Such a change suggests that polarization is fixed under a high electric field. In contrast, at 87 kV/cm, the effective permittivities of the second to fourth graphs 10G2 to 10G4, representing the first relaxor-ferroelectric material, are higher than the effective permittivity of BTO.

These results illustrate that when the solid solution concentration of the first relaxor-ferroelectric material increases in a given range, a degree of decrease in the permittivity of the first relaxor-ferroelectric material under the high electric field is less than that of BTO.

Figure 11:
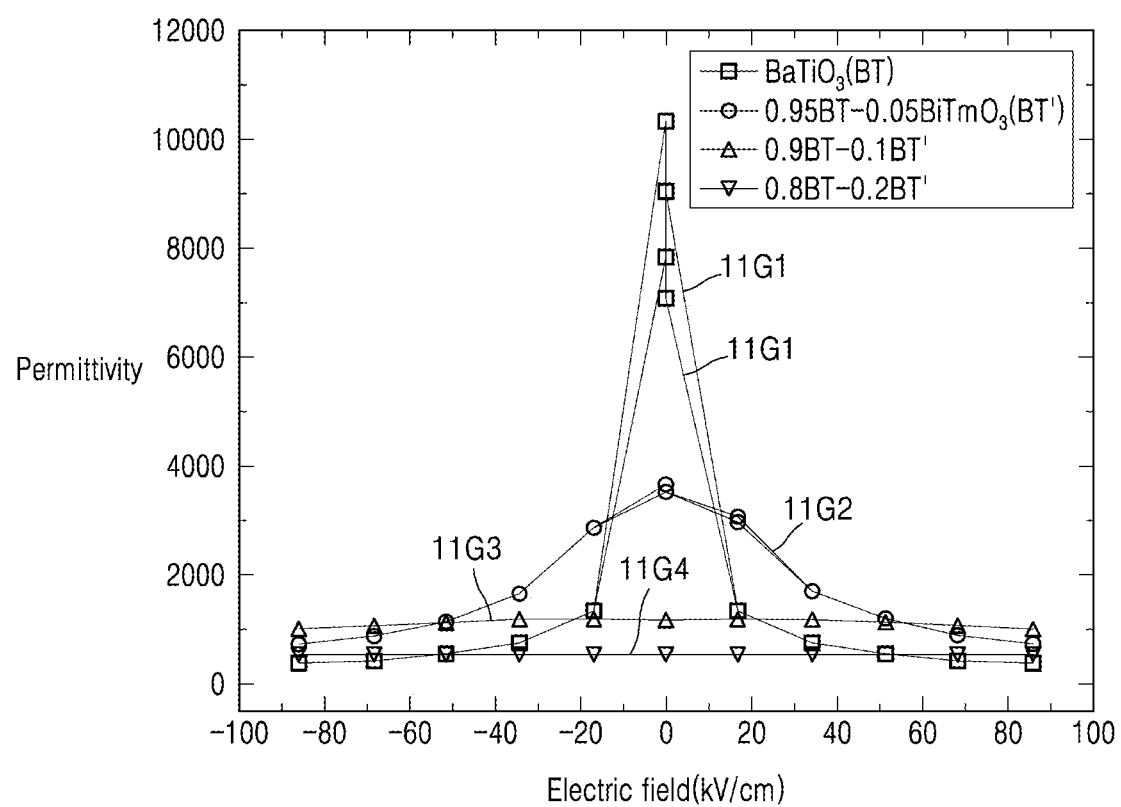
FIG. 11 is a graph showing permittivity-electric field characteristics of the second relaxor-ferroelectric material used to obtain the XRD analysis result of FIG. 7 and the ferroelectric material of the related art.

FIG. 11 is a graph showing permittivity-electric field characteristics of a second relaxor-ferroelectric materials used to obtain the XRD analysis result of FIG. 7 and the conventional ferroelectric material. In FIG. 11, the horizontal axis represents the electric field, and the vertical axis represents the permittivity.

In FIG. 11, a first graph 11G1 shows a change in the permittivity of BTO which is the conventional ferroelectric material when the electric field changes between −87 kV/cm and +87 kV/cm. A second graph 11G2 shows a change in the permittivity when the electric field changes between −87 kV/cm and +87 kV/cm, and the solid solution concentration of the second relaxor-ferroelectric material is about 5 mol %. A third graph 11G3 shows a change in the permittivity when the electric field changes between −87 kV/cm and +87 kV/cm, and the solid solution concentration of the second relaxor-ferroelectric material is about 10 mol %. A fourth graph 11G4 shows a change in the permittivity when the electric field changes between −87 kV/cm and +87 kV/cm, and the solid solution concentration of the second relaxor-ferroelectric material is about 20 mol %.

Upon comparing the first to fourth graphs 11G1 to 11G4 of FIG. 11, it may be seen in the case of BTO (the first graph 11G1) that the permittivity rapidly decreases as the electric field increases from 0 to 87 kV/cm. Such a change suggests that polarization is fixed under a high electric field. In contrast, at 87 kV/cm, the effective permittivities of the second to fourth graphs 11G2 to 11G4, representing the second relaxor-ferroelectric materials, are higher than the effective permittivity of BTO.

These results illustrate that when the solid solution concentration of the second relaxor-ferroelectric material increases in a given range, a degree of decrease in the permittivity of the second relaxor-ferroelectric material under the high electric field is less than that of BTO.

Figure 12:
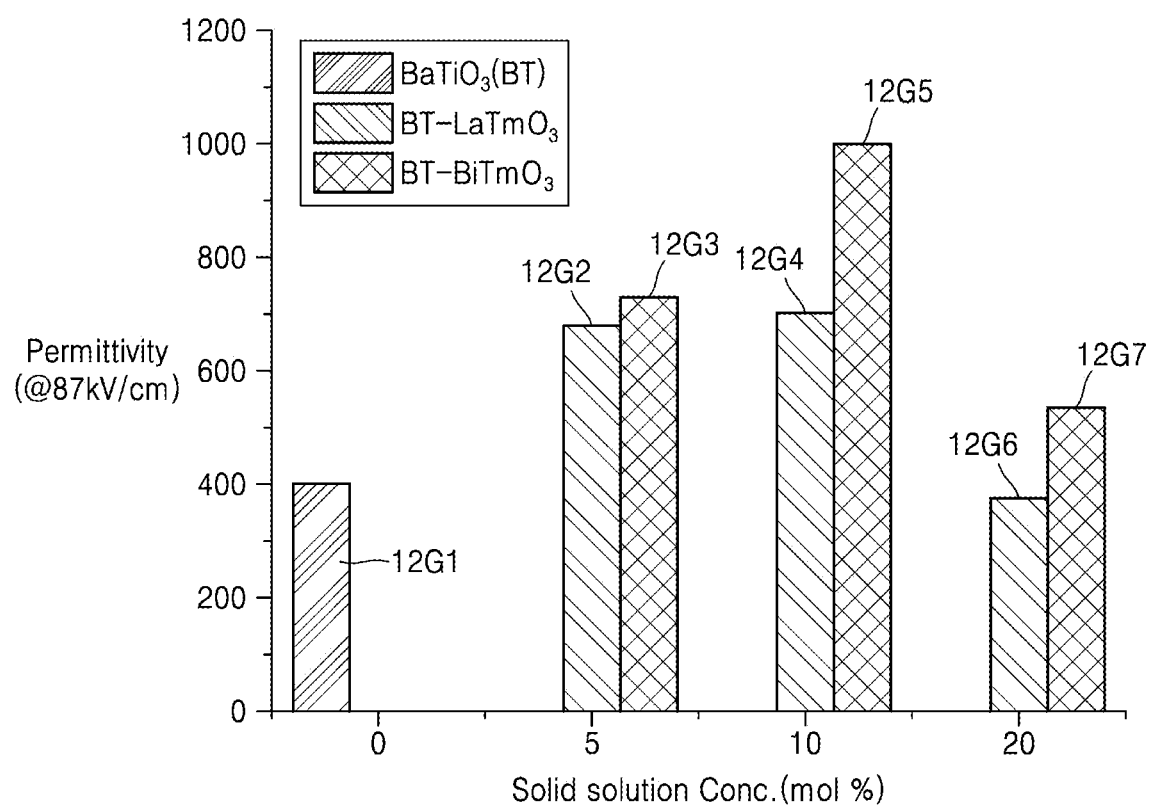
FIG. 12 is a graph showing the relationship of permittivity under an electric field according to the solid solution concentration included in the first and second relaxor-ferroelectric materials used to obtain the XRD analysis results of FIGS. 4 and 7.

FIG. 12 is a graph showing the relationship of permittivity under a specific high electric field (87 kV/cm) according to concentrations of the solid solutions included in the first and second relaxor-ferroelectric materials used to obtain the XRD analysis results of FIGS. 4 and 7. In FIG. 12, the horizontal axis represents the solid solution concentration, and the vertical axis represents a change in the permittivity in the high electric field. A first graph 12G1 relates to BTO. Second and third graphs 12G2 and 12G3 relate to the first and second relaxor-ferroelectric materials each having the solid solution concentration of about 5 mol %. Fourth and fifth graphs 12G4 and 12G5 relate to the first and second relaxor-ferroelectric materials each having the solid solution concentration of about 10 mol %. Sixth and seventh graphs 12G6 and 12G7 relate to the first and second relaxor-ferroelectric materials each having the solid solution concentration of about 20 mol %.

Referring to FIG. 12, it may be seen that the effective permittivity of the first and second relaxor-ferroelectric materials having the solid solution is higher than that of BTO having no solid solution. In particular, it may be seen that when the solid solution concentration of the first and second relaxor-ferroelectric material is 10 mol % and the vicinity thereof, the effective permittivity of the first and second relaxor-ferroelectric materials is high. In addition, it may be seen that in the entire range of the solid solution concentration, the effective permittivity of the second relaxor-ferroelectric material (e.g., the third, fifth, and seventh graphs 12G3, 12G5, and 12G7) is greater than the effective permittivity of the first relaxor-ferroelectric material (e.g., the second, fourth and sixth graphs 12G2, 12G4, and 12G6). In particular, when the solid solution concentration is about 10 mol %, the effective permittivity of the second relaxor-ferroelectric material (the fifth graph (12G5) is 900 or more, which is twice or more the effective permittivity of the conventional BTO having no solid solution (the first graph 12G1).

Figure 13:
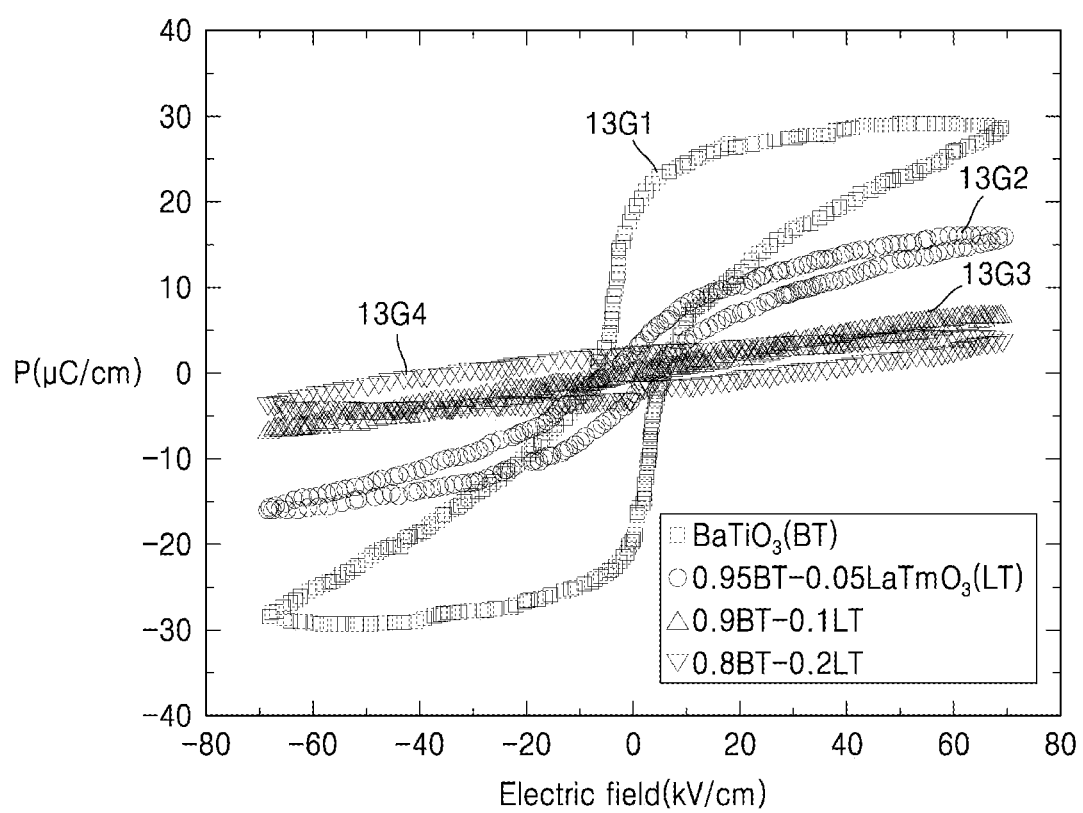
FIG. 13 is a graph showing polarization-electric field characteristics of the first relaxor-ferroelectric material used to obtain the XRD analysis result of FIG. 4 and the ferroelectric material of the related art.

FIG. 13 is a graph showing polarization-electric field characteristics of a first relaxor-ferroelectric material used to obtain the XRD analysis result of FIG. 4 and the conventional ferroelectric material.

In FIG. 13, the horizontal axis represents the electric field, and the vertical axis represents the polarization.

In FIG. 13, a first graph 13G1 shows the result of the conventional BTO. A second graph 13G2 shows the result when the solid solution concentration of the first relaxor-ferroelectric material is about 5 mol %. A third graph 13G3 shows the result when the solid solution concentration of the first relaxor-ferroelectric material is about 10 mol %. A fourth graph 13G4 shows the result when the solid solution concentration of the first relaxor-ferroelectric material is about 20 mol %.

Upon comparing the first to fourth graphs 13G1 to 13G4 of FIG. 13, the first graph 13G1 is an S-shaped curve showing the representative ferroelectric hysteresis characteristic. In contrast, the second to fourth graphs 13G2 to 13G4 suggest that both a maximum polarization $P_{max}$ and a remanent polarization $P_r$ decrease as the solid solution concentration of the first relaxor-ferroelectric material increases. Also, as the solid solution concentration of the first relaxor-ferroelectric material increases, the second to fourth graphs 13G2 to 13G4 change to a linear curve in proportional to the electric field, which suggests that the first relaxor-ferroelectric material shows a relaxor behavior resulted from pseudo-cubic crystal structure in a P-E characteristic.

Figure 14:
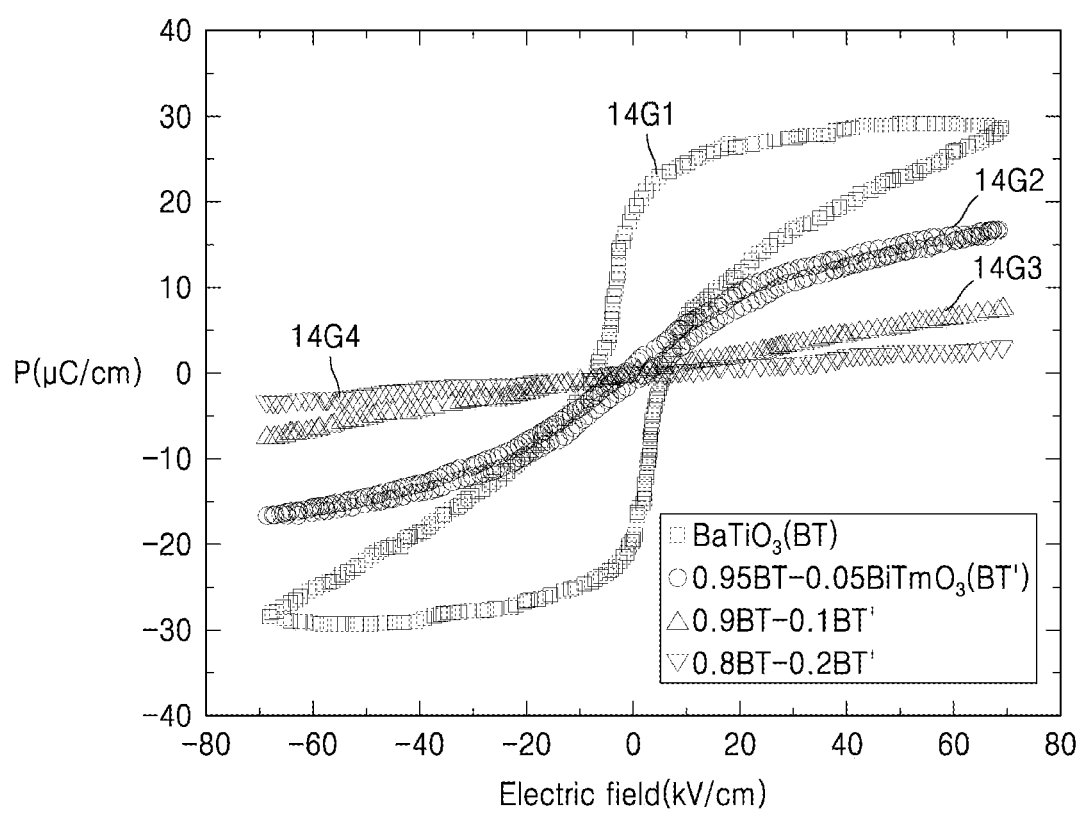
FIG. 14 is a graph showing polarization-electric field characteristics of the second relaxor-ferroelectric material used to obtain the XRD analysis result of FIG. 7 and the ferroelectric material of the related art.

FIG. 14 is a graph showing polarization-electric field characteristics of the second relaxor-ferroelectric material used to obtain the XRD analysis result of FIG. 7 and the conventional ferroelectric material.

In FIG. 14, the horizontal axis represents the electric field, and the vertical axis represents the polarization.

In FIG. 14, a first graph 14G1 shows the result of the conventional BTO. A second graph 14G2 shows the result when the solid solution concentration of the second relaxor-ferroelectric material is about 5 mol %. A third graph 14G3 shows the result when the solid solution concentration of the second relaxor-ferroelectric material is about 10 mol %. A fourth graph 14G4 shows the result when the solid solution concentration of the second relaxor-ferroelectric material is about 20 mol %.

Upon comparing the first to fourth graphs 14G1 to 14G4 of FIG. 14, the first graph 14G1 is an S-shaped curve showing the representative ferroelectric hysteresis characteristic. In contrast, the second to fourth graphs 14G2 to 14G4 suggest that both the maximum polarization $P_{max}$ and the remnant polarization $P_r$ decrease as the solid solution concentration of the second relaxor-ferroelectric material increases.

Also, as the solid solution concentration of the second relaxor-ferroelectric material increases, the second to fourth graphs 14G2 to 14G4 change to a linear curve in proportional to the electric field, which suggests that the second relaxor-ferroelectric material has a pseudo-cubic crystal structure.

Figure 15:
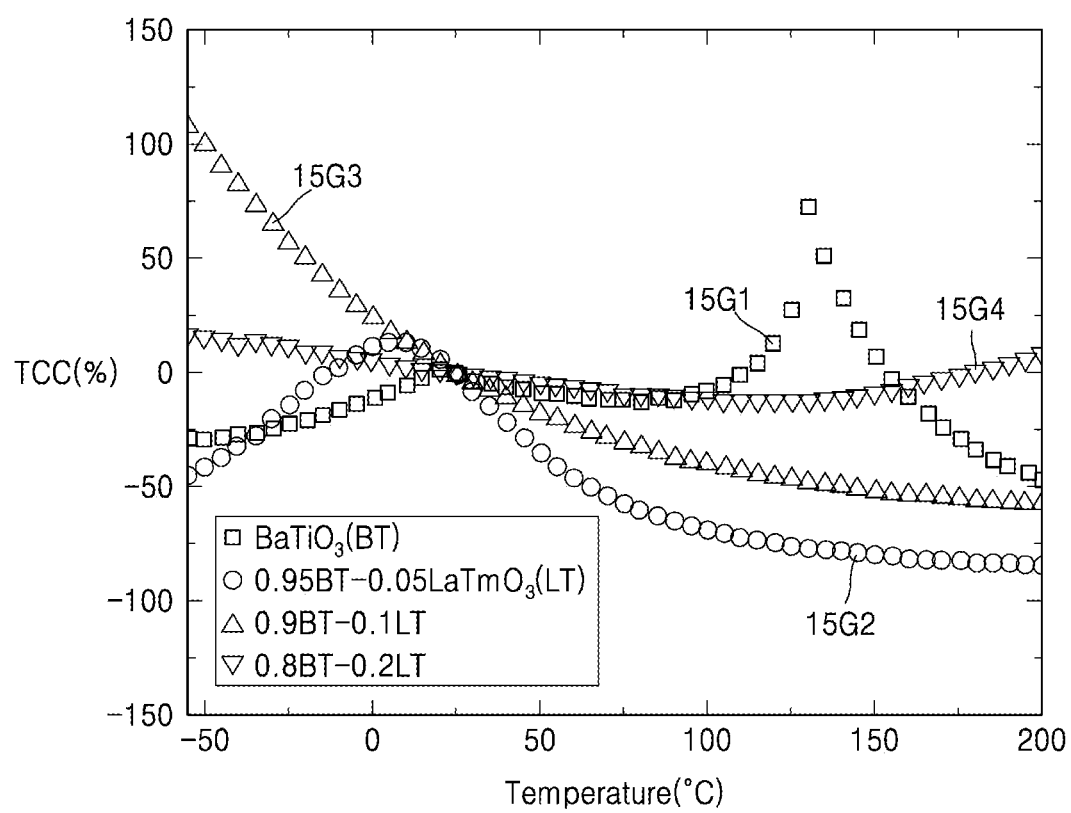
FIG. 15 is a graph showing a relationship between a temperature coefficient of capacitance (TCC) and a temperature with respect to the first relaxor-ferroelectric material used to obtain the XRD analysis result of FIG. 4 and the ferroelectric material of the related art.

FIG. 15 is a graph showing a relationship between a TCC and a temperature with respect to the first relaxor-ferroelectric material used to obtain the XRD analysis result of FIG. 4 and the conventional ferroelectric material in a given temperature range (−55° C. to 200° C.).

In FIG. 15, the horizontal axis represents the temperature and the vertical axis represents the TCC.

In FIG. 15, a first graph 15G1 shows the results of the conventional BTO having no solid solution. A second graph 15G2 shows a result when the solid solution concentration of the first relaxor-ferroelectric material is about 5 mol %. A third graph 15G3 shows a result when the solid solution concentration of the first relaxor-ferroelectric material is about 10 mol %. A fourth graph 15G4 shows a result when the solid solution concentration of the first relaxor-ferroelectric material is about 20 mol %.

Upon comparing the first to fourth graphs 15G1 to 15G4 of FIG. 15, in the case of the conventional BTO (the first graph 15G1), a temperature dependent instability appears near 5° C. and 125° C. as a phase transition from orthorhombic to tetragonal and from tetragonal to cubic occurs in the BTO, and, as a result, a rapid change in the permittivity occurs. In the case of the second to fourth graphs 15G2 to 15G4, it may be seen that a TCC curve is gradual and gentle as the solid solution concentration of the first relaxor-ferroelectric material increases such that the temperature stability is improved compared to BTO. For example, when the solid solution concentration is about 20 mol %, it may be seen that the temperature stability is greatly improved compared to BTO.

Figure 16:
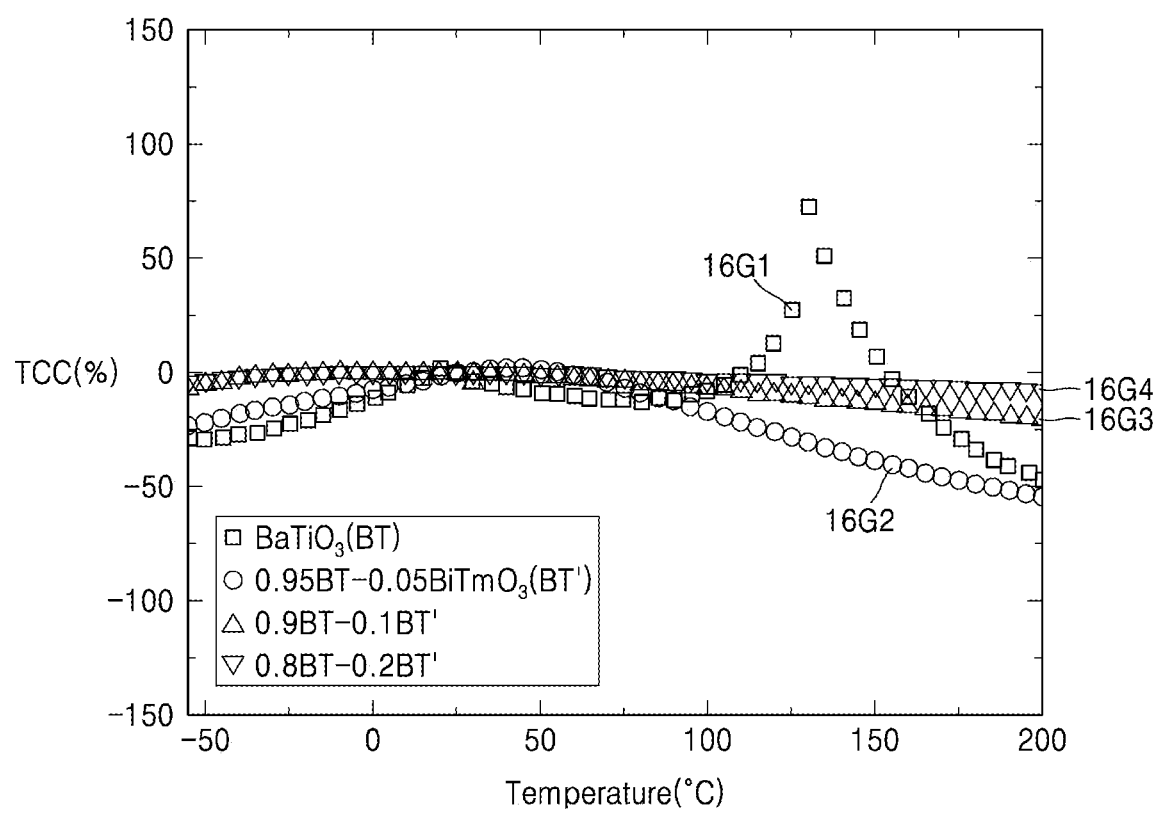
FIG. 16 is a graph showing a relationship between a TCC and a temperature with respect to the second relaxor-ferroelectric material used to obtain the XRD analysis result of FIG. 7 and the ferroelectric material of the related art.

FIG. 16 is a graph showing a relationship between a TCC and a temperature with respect to a second relaxor-ferroelectric material used to obtain the XRD analysis result of FIG. 7 and the conventional ferroelectric material in a given temperature range (−55° C. to 200° C.).

In FIG. 16, the horizontal axis represents the temperature and the vertical axis represents the TCC.

In FIG. 16, a first graph 16G1 shows the results of the conventional BTO having no solid solution. A second graph 16G2 shows a result when the solid solution concentration of the second relaxor-ferroelectric material is about 5 mol %. A third graph 16G3 shows a result when the solid solution concentration of the second relaxor-ferroelectric material is about 10 mol %. A fourth graph 16G4 shows a result when the solid solution concentration of the second relaxor-ferroelectric material is about 20 mol %.

The first graph 16G1 shows that in the case of the conventional BTO, a temperature dependent instability appears near 5° C. and 125° C., which indicates a phase transition from orthorhombic to tetragonal and from tetragonal to cubic and resulting rapid change in the permittivity. In contrast, the second to fourth graphs 16G2 to 16G4 show that a TCC curve is gradual and gentle as the solid solution concentration of the second relaxor-ferroelectric material increases such that the temperature stability is improved compared to BTO. In particular, when the solid solution concentration is about 20 mol %, the second to fourth graphs 16G2 to 16G4 show a clear temperature stability compared to BTO.

Upon comparing the second to fourth graphs 15G2 to 15G4 of FIG. 15 and the second to fourth graphs 16G2 to 16G4 of FIG. 16, it may be seen that the temperature stability of the second relaxor-ferroelectric material is relatively better than that of the first relaxor-ferroelectric material.

From the results described above, when a PNR including the solid solution is present in the relaxor-ferroelectric material, it may be seen that the effective permittivity of the relaxor-ferroelectric material may be improved even under a high electric field caused by a high DC voltage and the relaxor-ferroelectric material may maintain the dielectric characteristic even under the high electric field due to, without being limited to a particular theory of operation, the donor-acceptor defect cluster. In particular, it may be seen that when Bi, which has the same defect concentration and ion radius as La but has the lone-pair electron characteristic, is used as a donor of the solid solution, the dielectric characteristic under the high electric field and the temperature stability are relatively excellent.

In FIG. 12, when the solid solution concentration of the second relaxor-ferroelectric material increases to about 5 mol % to about 10 mol %, the effective permittivity of the second relaxor-ferroelectric material under a high electric field (e.g., 87 kV/cm) may increase. However, the effective permittivity tends to decrease as the solid solution concentration exceeds 10 mol %.

Accordingly, when the solid solution concentration of the second relaxor-ferroelectric material is between about 5 mol % and about 10 mol %, to more specifically confirm the dielectric characteristic and the temperature stability of the second relaxor-ferroelectric material [e.g., (1-X)BaTiO$_3$—(X)BiTmO$_3$], changes in the dielectric characteristic and the temperature stability of the second relaxor-ferroelectric material are reviewed in cases where the solid solution concentration is 5 mol % (X=0.05), 6 mol % (X=0.06), 7 mol % (X=0.07), 8 mol % (X=0.08), and 10 mol % (X=0.1). This will be described below.

Figure 17:
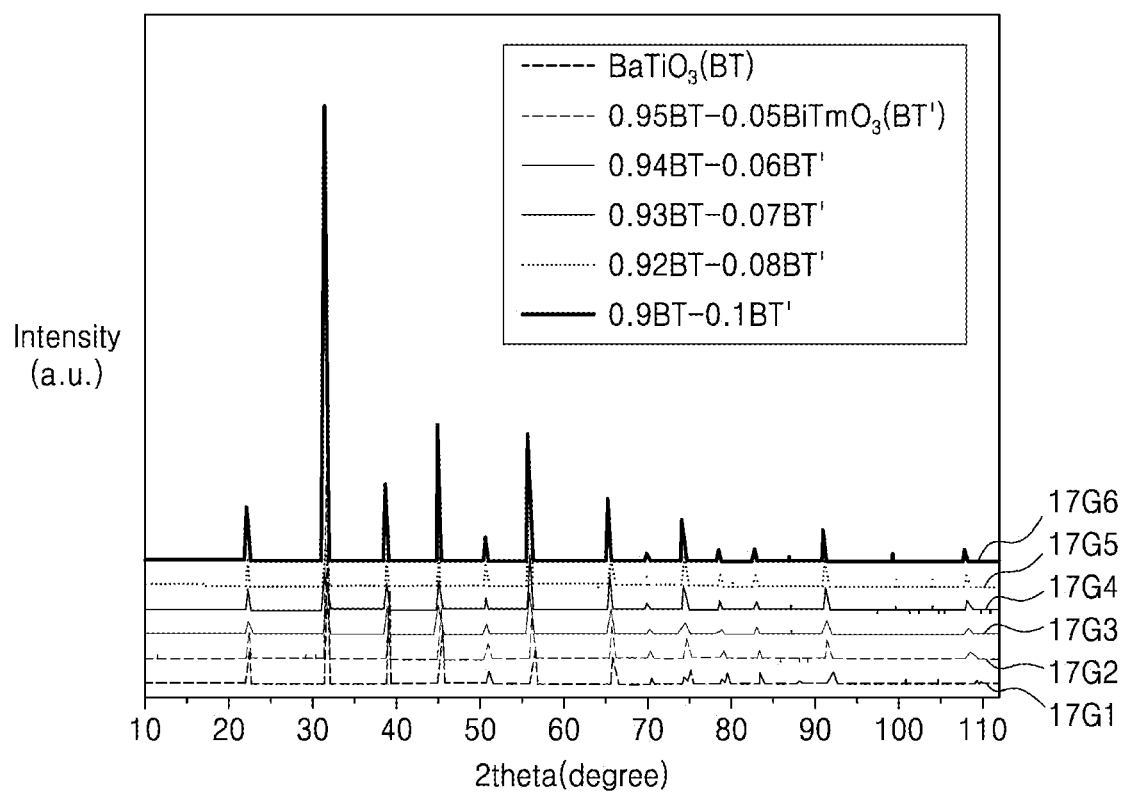
FIGS. 17 to 19 are graphs showing XRD analysis results when the solid solution concentration of the second relaxor-ferroelectric material used to obtain the XRD analysis result of FIG. 7 is between 5 mol % and 10 mol %.
Figure 18:
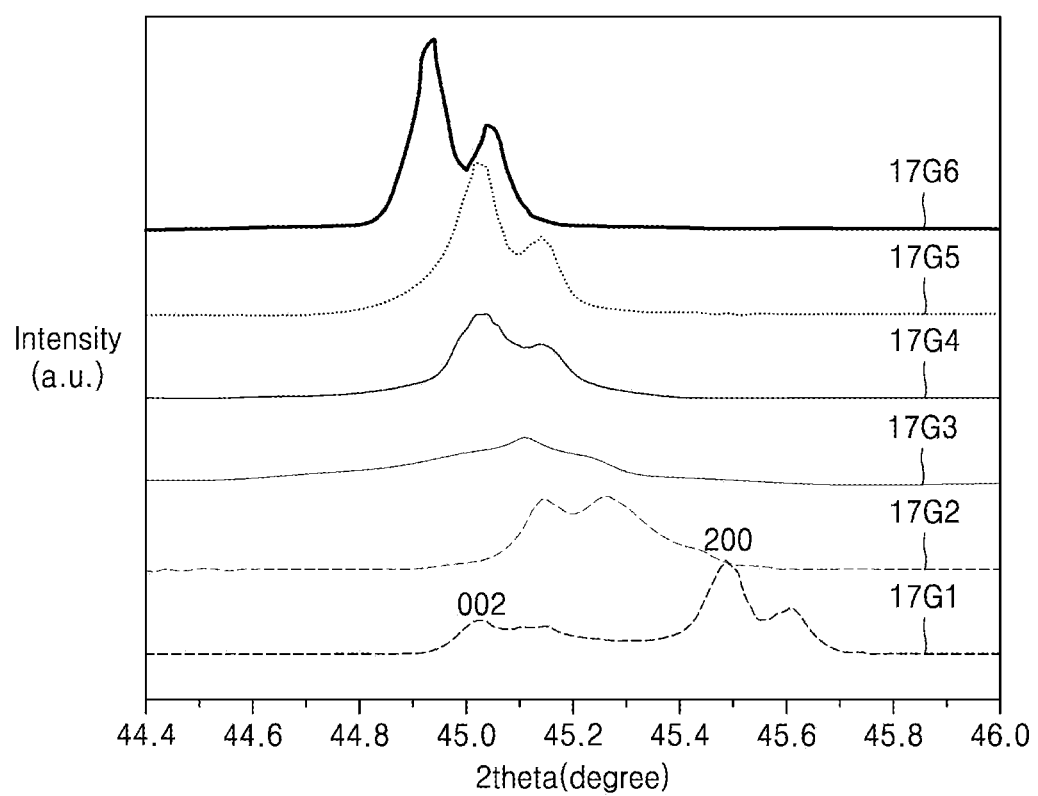
Figure 19:
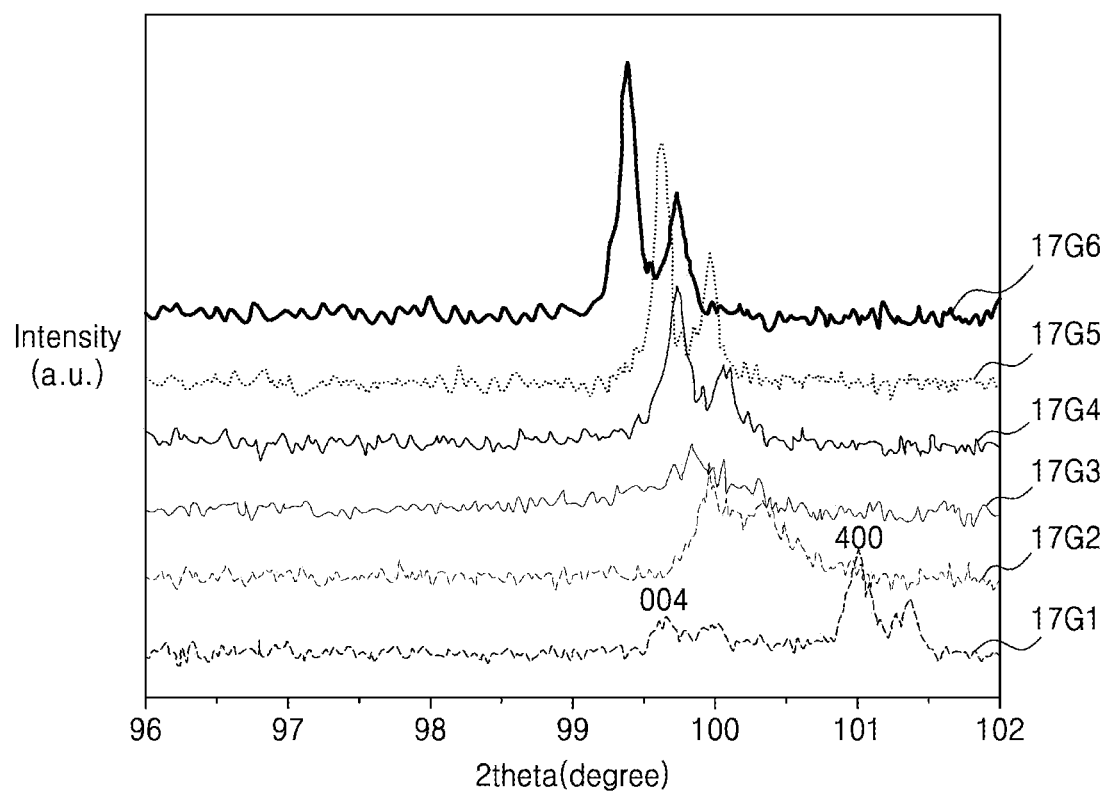

FIGS. 17 to 19 are graphs showing XRD analysis results when the solid solution concentration of the second relaxor-ferroelectric material used to obtain the XRD analysis result of FIG. 7 is between about 5 mol % and about 10 mol %, and an XRD analysis result of the conventional BTO.

FIG. 18 is a diagram showing only a part corresponding to a range of a relatively low angle in FIG. 17, and FIG. 19 is a diagram showing only a part corresponding to a range of a relatively high angle in FIG. 17.

In FIG. 17, a first graph 17G1 shows the result of the conventional BTO. A second graph 17G2 shows the result when the solid solution concentration of the second relaxor-ferroelectric material is about 5 mol %, (e.g., wherein the composition of the second relaxor-ferroelectric material is about 0.95BT-0.05BT'). A third graph 17G3 shows the result when the solid solution concentration of the second relaxor-ferroelectric material is about 6 mol % (e.g., wherein the composition of the second relaxor-ferroelectric material is about 0.94BT-0.06BT'). A fourth graph 17G4 shows the result when the solid solution concentration of the second relaxor-ferroelectric material is about 7 mol % (e.g., wherein the composition of the second relaxor-ferroelectric material is about 0.93BT-0.07BT'). A fifth graph 17G5 shows the result when the solid solution concentration of the second relaxor-ferroelectric material is about 8 mol % (e.g., wherein the composition of the second relaxor-ferroelectric material is about 0.92BT-0.08BT'). A sixth graph 17G6 shows the result when the solid solution concentration of the second relaxor-ferroelectric material is about 10 mol % (e.g., wherein the composition of the second relaxor-ferroelectric material is about 0.9BT-0.1BT').

Upon comparing the first to sixth graphs 17G1 to 17G6 of FIG. 17, the peaks of the second to sixth graphs 17G2 to 17G6 (the solid solution concentration from about 5 mol % to about 10 mol %) and the peak of the first graph 17G1 (BTO) are generally consistent throughout. This fact suggests that both the second relaxor-ferroelectric material having the solid solution concentration from about 5 mol % to about 10 mol % and the conventional BTO share a single phase.

However, referring to FIG. 18, the (002) peak appears in the first graph 17G1 in a low angle region, but does not appear in the second to sixth graphs 17G2 to 17G6.

Similarly, referring to FIG. 19, the peak (004) appears in the first graph 17G1 in a high angle region, but does not appear in the second to sixth graphs 17G2 to 17G6.

The results of FIGS. 18 and 19 suggest that the second relaxor-ferroelectric material including a solid solution concentration of about 5 mol % to about 10 mol % has a pseudo-cubic crystal structure.

Figure 20:
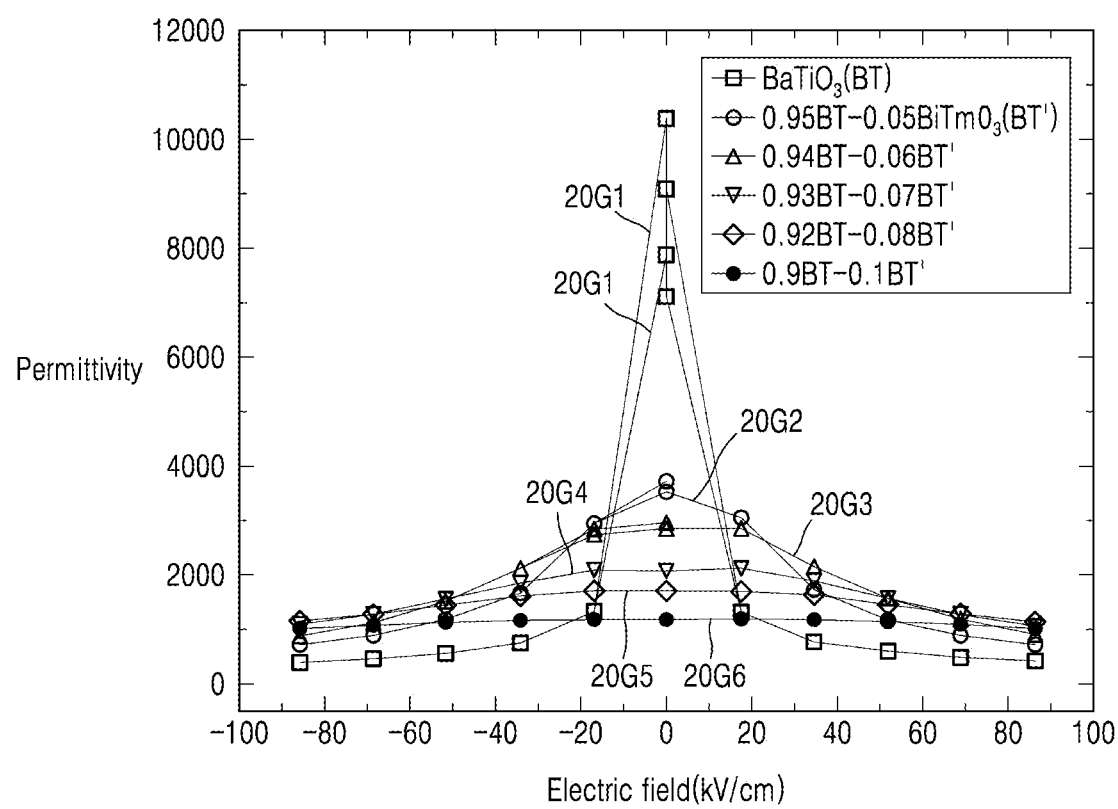
FIG. 20 is a graph showing permittivity-electric field characteristics of the second relaxor-ferroelectric material indicating the XRD analysis result of FIG. 17.

FIG. 20 is a graph showing permittivity-electric field characteristics of the second relaxor-ferroelectric material used to obtain the XRD analysis result of FIG. 17.

In FIG. 20, the horizontal axis represents the electric field, and the vertical axis represents the permittivity.

In FIG. 20, a first graph 20G1 shows a change in the permittivity of BTO which is the conventional ferroelectric material when the electric field changes between −87 kV/cm and +87 kV/cm. A second graph 20G2 shows a change in the permittivity when the electric field changes between −87 kV/cm and +87 kV/cm, and the solid solution concentration of the second relaxor-ferroelectric material is about 5 mol %. A third graph 20G3 shows a change in the permittivity when the electric field changes between −87 kV/cm and +87 kV/cm, and the solid solution concentration of the second relaxor-ferroelectric material is about 6 mol %. A fourth graph 20G4 shows a change in the permittivity when the electric field changes between −87 kV/cm and +87 kV/cm, and the solid solution concentration of the second relaxor-ferroelectric material is about 7 mol %. A fifth graph 20G5 shows a change in the permittivity when the electric field changes between −87 kV/cm and +87 kV/cm, and the solid solution concentration of the second relaxor-ferroelectric material is about 8 mol %. A sixth graph 20G6 shows a change in the permittivity when the electric field changes between −87 kV/cm and +87 kV/cm, and the solid solution concentration of the second relaxor-ferroelectric material is about 10 mol %.

Upon comparing the first to sixth graphs 20G1 to 20G6 of FIG. 20, in the case of BTO (the first graph 20G1), it may be seen that the permittivity drops sharply as the electric field increases from 0 to 87 kV/cm. This change suggests that polarization is fixed under a high electric field. In addition, the effective permittivity of BTO (the first graph 20G1) is as low as 400 at 87 kV/cm due to the fixation phenomenon in the high electric field. In contrast, the second relaxor-ferroelectric material (e.g., the second to sixth graphs 20G2 to 20G6) exhibits a tendency that illustrates, as the concentration in the solid solution increases, a pseudo-cubic greatly proceeds, and an permittivity at 0 kV/cm decreases, and the effective permittivity at 87 kV/cm increases when the concentration in the solid solution changes from about 5 mol % to about 8 mol %, and then decreases when the concentration in the solid solution is about 10 mol %.

Figure 21:
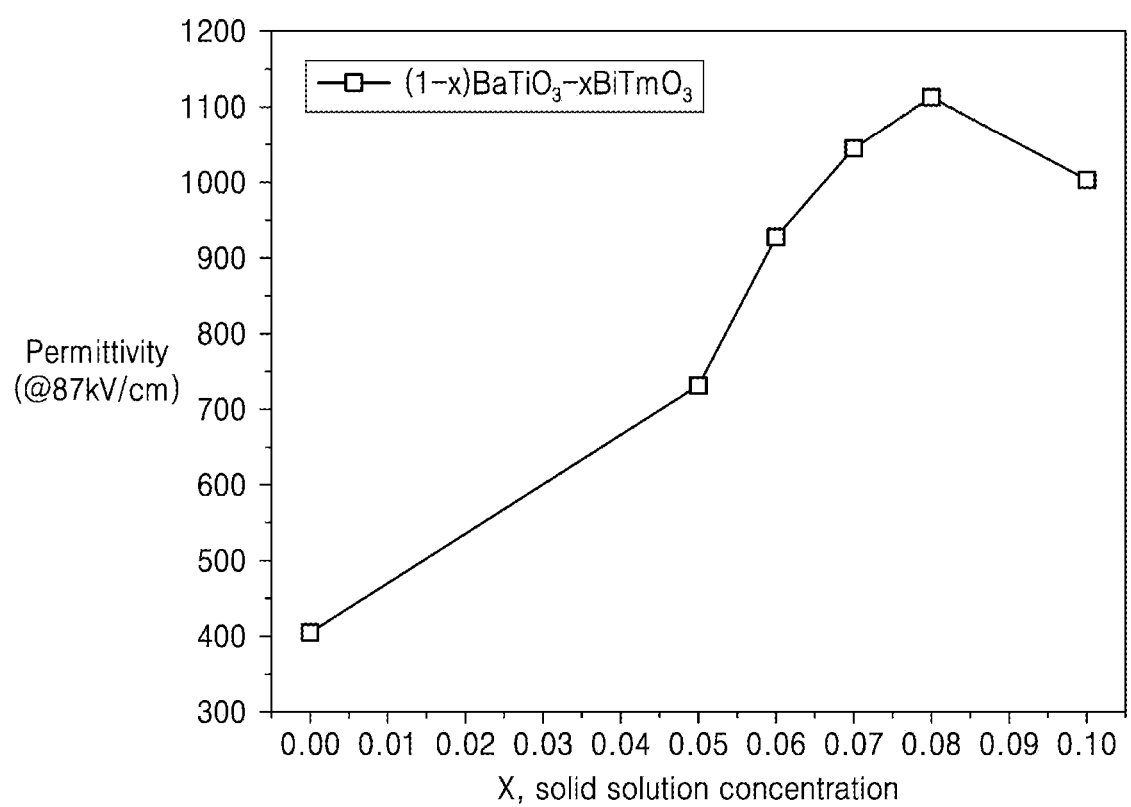
FIG. 21 is a graph showing a change in permittivity at a specific electric field according to the solid solution concentration of the second relaxor-ferroelectric material showing the permittivity-electric field characteristics of FIG. 20.

FIG. 21 is a graph showing a change in permittivity at a specific electric field according to the solid solution concentration of the second relaxor-ferroelectric material showing the permittivity-electric field characteristics of FIG. 20.

Referring to FIG. 21, it may be seen that when the solid solution concentration of the second relaxor-ferroelectric material is about 6 mol %, about 7 mol %, about 8 mol %, and about 10 mol %, the effective permittivity of the second relaxor-ferroelectric material is 900 or more under a high electric field of 87 kV/cm.

Figure 22:
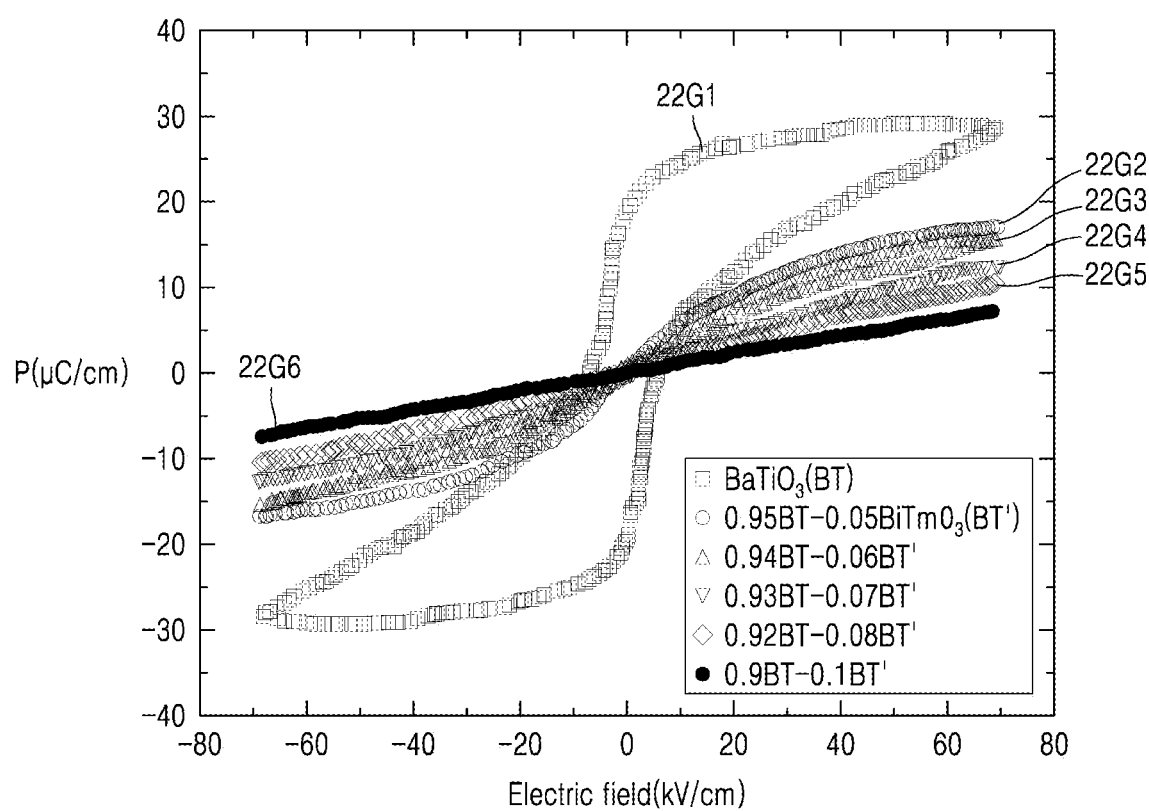
FIG. 22 is a graph showing polarization-electric field characteristics of the second relaxor-ferroelectric material used to obtain the XRD analysis result of FIG. 17 and the ferroelectric material of the related art.

FIG. 22 is a graph showing polarization-electric field characteristics of the second relaxor-ferroelectric material used to obtain the XRD analysis result of FIG. 17 and the conventional ferroelectric material BTO.

In FIG. 22, the horizontal axis represents the electric field, and the vertical axis represents the polarization.

In FIG. 22, a first graph 22G1 shows the result of the conventional BTO. A second graph 22G2 shows the result when the solid solution concentration of the second relaxor-ferroelectric material is about 5 mol %. A third graph 22G3 shows the result when the solid solution concentration of the second relaxor-ferroelectric material is about 6 mol %. A fourth graph 22G4 shows the result when the solid solution concentration of the second relaxor-ferroelectric material is about 7 mol %. A fifth graph 22G5 shows the result when the solid solution concentration of the second relaxor-ferroelectric material is about 8 mol %. A sixth graph 22G6 shows the result when the solid solution concentration of the second relaxor-ferroelectric material is about 10 mol %.

Upon comparing the first to sixth graphs 22G1 to 22G6 of FIG. 22, the first graph 22G1 is an S-shaped curve showing the representative ferroelectric hysteresis characteristic. In contrast, the second to sixth graphs 22G2 to 22G6 suggest that both the maximum polarization $P_{max}$ and the remanent polarization $P_r$ decrease as the solid solution concentration of the second relaxor-ferroelectric material increases. Also, as the solid solution concentration of the second relaxor-ferroelectric material increases, the second to sixth graphs 22G2 to 22G6 change to a linear curve in proportional to the electric field, which suggests that the second relaxor-ferroelectric material has a pseudo-cubic structure.

Figure 23:
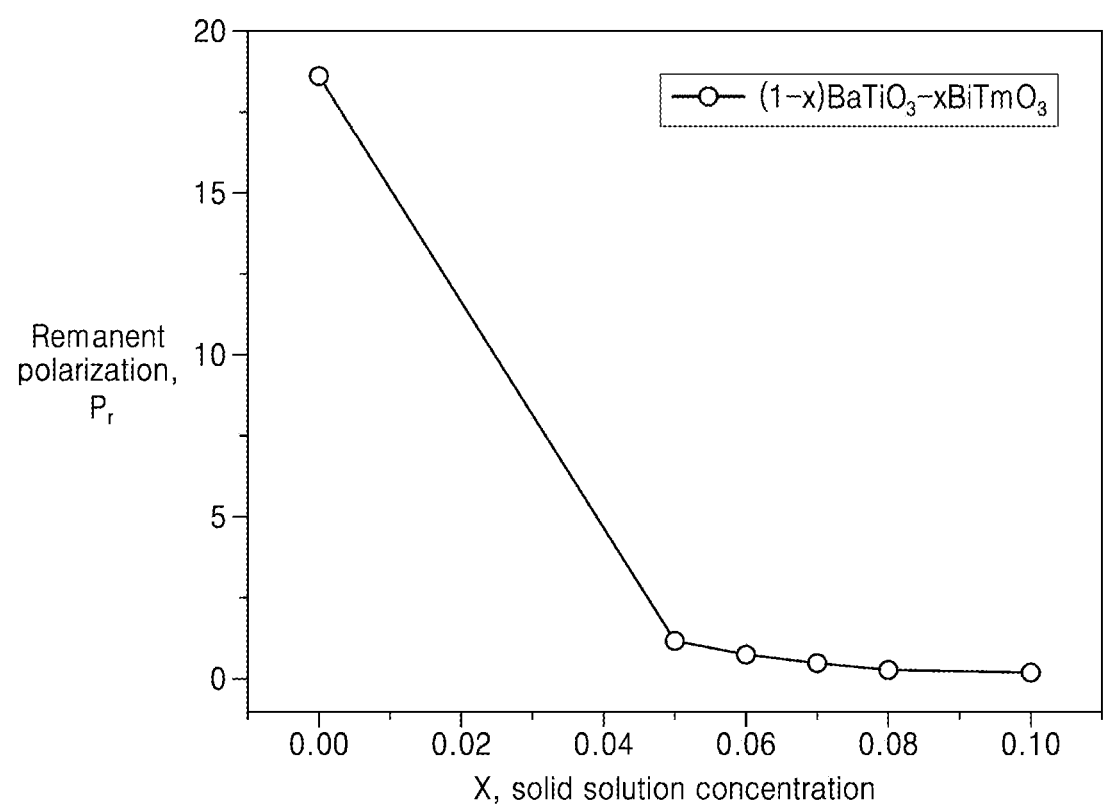
FIG. 23 is a graph showing the relationship of the solid solution concentration of the second relaxor-ferroelectric material used to obtain the XRD analysis result of FIG. 17 and remanent polarization.

FIG. 23 is a graph showing the relationship of the solid solution concentration of the second relaxor-ferroelectric material used to obtain the XRD analysis result of FIG. 17 and remnant polarization.

Referring to FIG. 23, it may be seen that as the solid solution concentration of the second relaxor-ferroelectric material increases, the pseudo-cubic becomes more prevalent, such that $P_r$ decreases.

Figure 24:
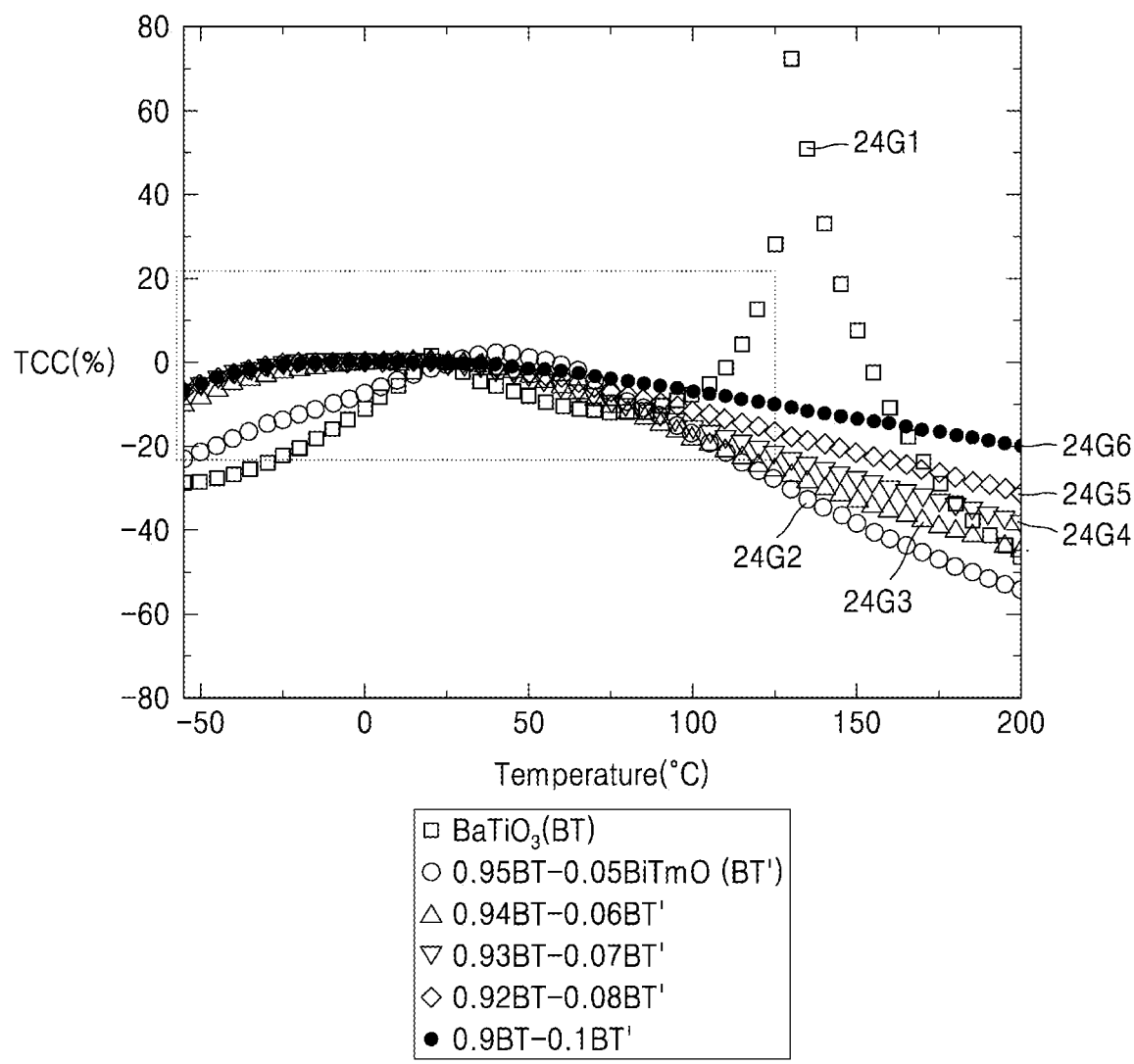
FIG. 24 is a graph showing a relationship between a TCC and a temperature with respect to the second relaxor-ferroelectric material used to obtain the XRD analysis result of FIG. 17.

FIG. 24 is a graph showing a relationship between a TCC and a temperature with respect to the second relaxor-ferroelectric material used to obtain the XRD analysis result of FIG. 17 and the conventional ferroelectric material in a given temperature range (−55° C. to 200° C.).

In FIG. 24, the horizontal axis represents the temperature and the vertical axis represents the TCC.

In FIG. 24, a first graph 24G1 shows the results of the conventional BTO having no solid solution. A second graph 24G2 shows a result when the solid solution concentration of the second relaxor-ferroelectric material is about 5 mol %. A third graph 24G3 shows a result when the solid solution concentration of the second relaxor-ferroelectric material is about 6 mol %. A fourth graph 24G4 shows a result when the solid solution concentration of the second relaxor-ferroelectric material is about 7 mol %. A fifth graph 24G5 shows a result when the solid solution concentration of the second relaxor-ferroelectric material is about 8 mol %. A sixth graph 24G6 shows a result when the solid solution concentration of the second relaxor-ferroelectric material is about 10 mol %.

Upon comparing the first to sixth graphs 24G1 to 24G6 of FIG. 24, it may be seen that a TCC curve is gradual and gentle as the solid solution concentration of the second relaxor-ferroelectric material increases and is stable in a relatively wide range. In FIG. 24, the dotted box indicates the TCC characteristics of a X7S dielectric, which is a dielectric material currently used as a product, and the TCC characteristics (the second to sixth graphs 24G2 to 24G6) of the second relaxor-ferroelectric material satisfy the TCC characteristics of X7S. X7S dielectrics, for example, may refer to a class 2 temperature stable dielectric ceramics, under the International Electrotechnical Commission (IEC), which may exhibit non-linear changes in capacitance due to the influence of variations in temperature (e.g., a TCC −22% to 22% in the temperature range −55° C. to 125° C.).

Specifically, when the solid solution concentration of the second relaxor-ferroelectric material is about 7 mol %, the TCC is about −21% to 0.9%, when the solid solution concentration of the second relaxor-ferroelectric material is about 8 mol %, the TCC is about −16% to 0.5%, and when the solid solution concentration of the second relaxor-ferroelectric material is about 10 mol %, the TCC is about −10% to 0.3%, all of which satisfy the TCC characteristics of X7S.

Next, the dielectric characteristics of the case wherein the solid solution concentration of the second relaxor-ferroelectric material, the A-site is fixed to Bi, and the B-site is replaced with a RE (e.g., Ho, Yb, Lu, etc.) other than Tm will be described. In addition, the effect of the ion radius of the RE locating in the B-site will be described. When the RE locating in the B-site is one of Ho, Tm, Yb, and Lu, the ion radius is the largest in $Ho^{3+}$ (0.90 Å), and decreases in the order of $Tm^{3+}$ (0.88 Å), $Yb^{3+}$ (0.868 Å), and $Lu^{3+}$ (0.86 Å). Because the element of the RE belongs to the lanthanide group, a lanthanide element may be located in the position of RE. In an example, at least one of Pr, Nd, Sm, Eu, Gd, Tb, Dy, Ho, Er, Tm, Yb, and Lu may be located in the position of RE.

Hereinafter, for clarity, a material in which Ho, instead of Tm, is located in the B-site in the solid solution of the second relaxor-ferroelectric material is referred to as a third relaxor-ferroelectric material; a material in which Yb, instead of Tm, is located in the B-site in the solid solution of the second relaxor-ferroelectric material is referred to as a fourth relaxor-ferroelectric material; and a material in which Lu, instead of Tm, is located in the B-site in the solid solution of the second relaxor-ferroelectric material is referred to as a fifth relaxor-ferroelectric material.

Figure 25:
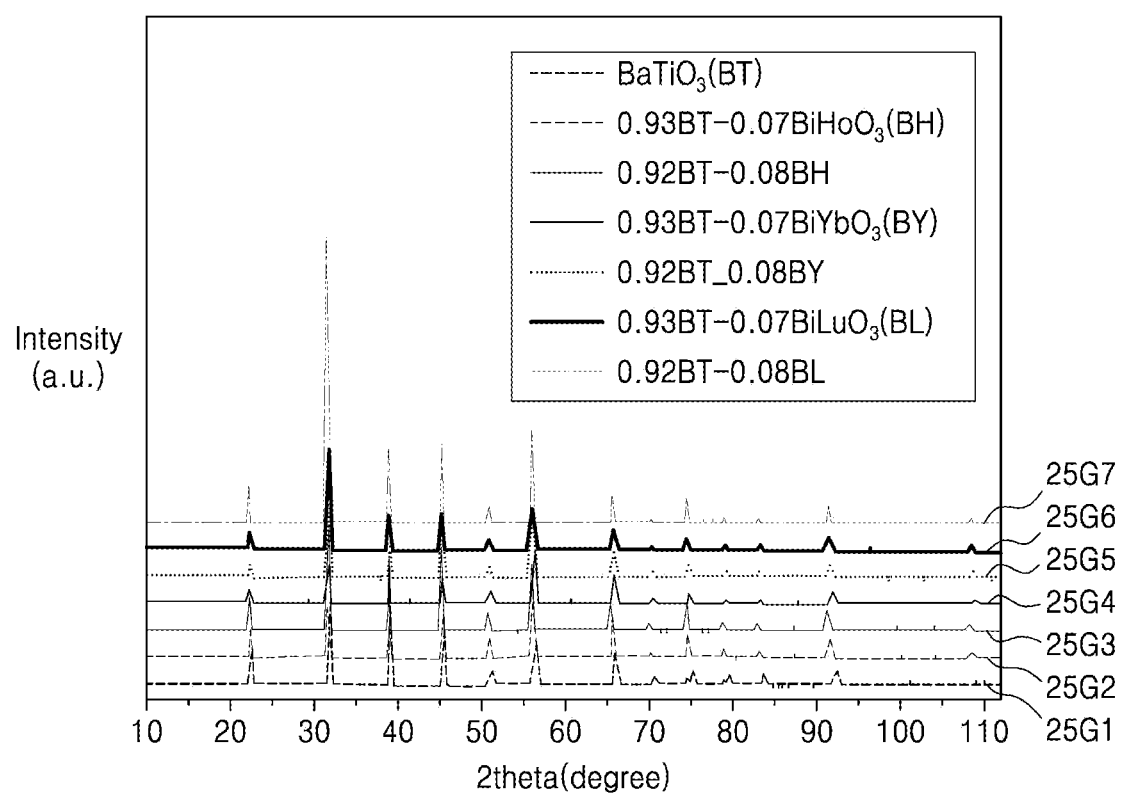
FIGS. 25 to 27 are graphs showing XRD analysis results of third to fifth relaxor-ferroelectric materials synthesized using the synthesizing method of FIG. 3 according to some example embodiments and the ferroelectric material of the related art.
Figure 26:
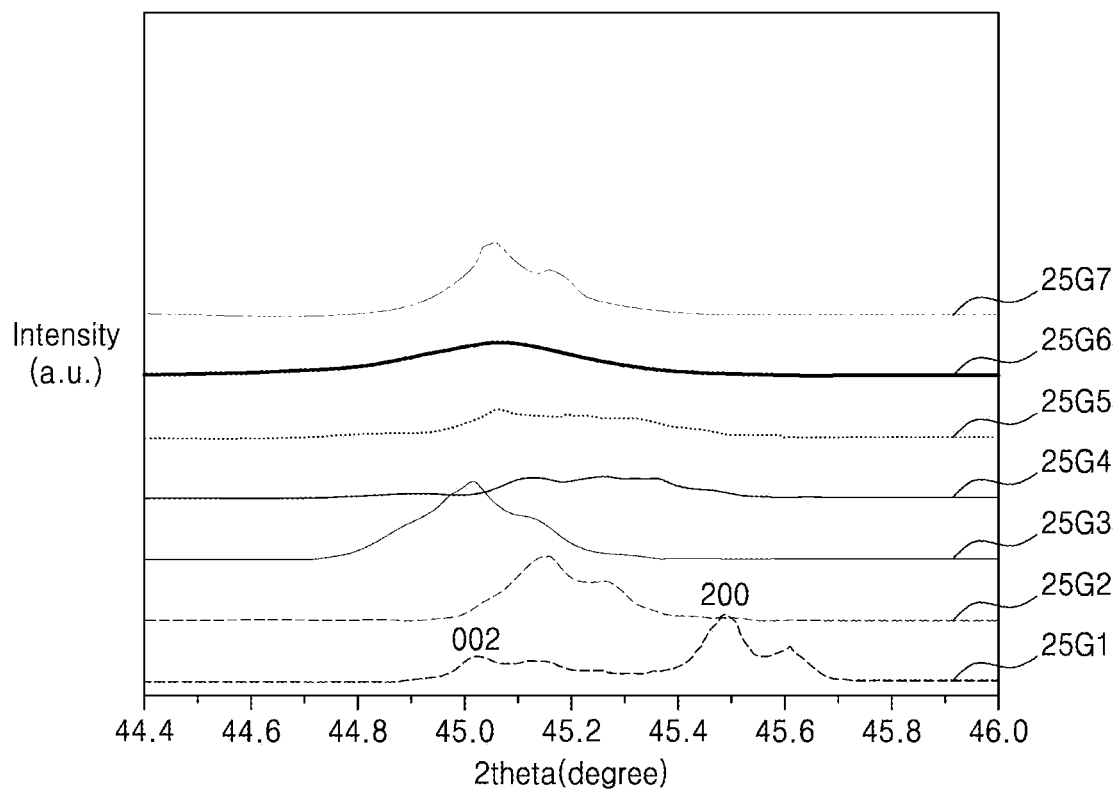
Figure 27:
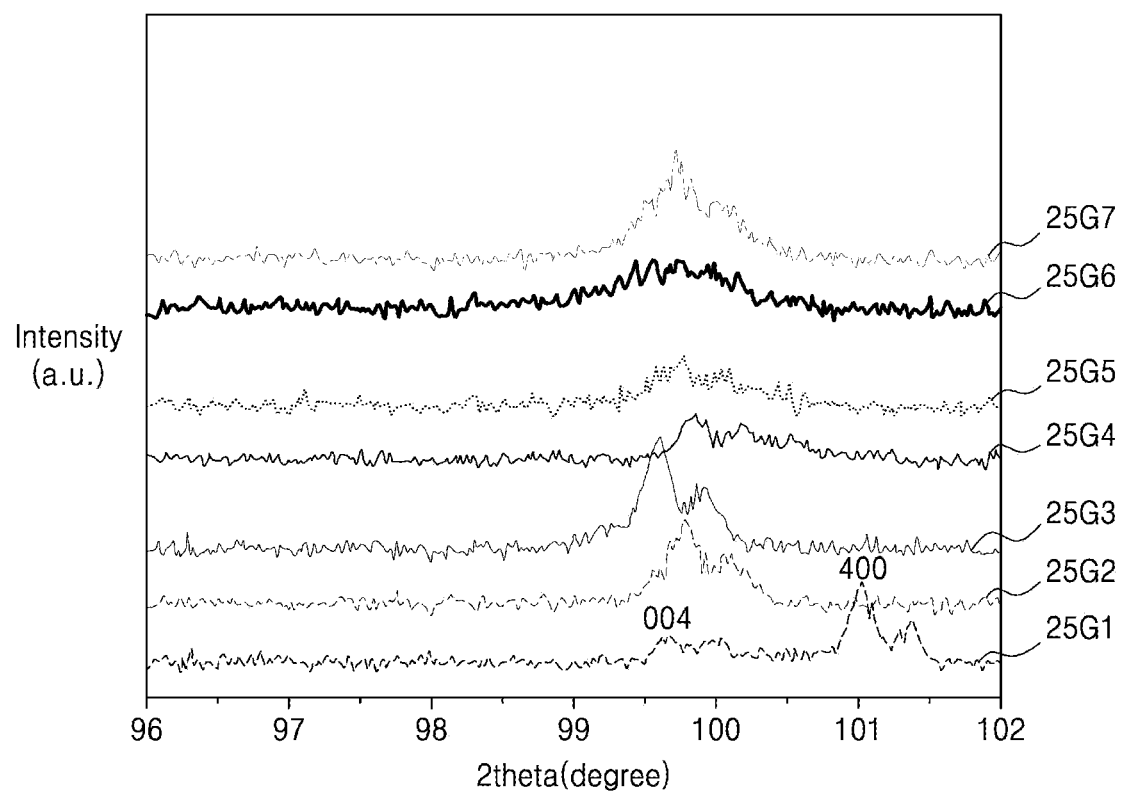

FIGS. 25 to 27 are graphs showing XRD analysis results of the third to fifth relaxor-ferroelectric materials synthesized such that the solid solution concentration is about 7 mol % and about 8 mol % in the synthesizing method of FIG. 3 according to an example embodiment and the conventional ferroelectric material.

In FIG. 25, a first graph 25G1 shows the result of the conventional BTO. A second graph 25G2 shows the result when the solid solution concentration of the third relaxor-ferroelectric material is about 7 mol % (e.g., wherein the composition of the third relaxor-ferroelectric material is about $0.93BaTiO_3$-$0.07BiHoO_3$($0.93BT$-$0.07BH$)). A third graph 25G3 shows the result when the solid solution concentration of the third relaxor-ferroelectric material is about 8 mol % (e.g., the composition of the third relaxor-ferroelectric material is about 0.92BT-0.08BH). A fourth graph 25G4 shows the result when the solid solution concentration of the fourth relaxor-ferroelectric material is about 7 mol % (e.g., the composition of the fourth relaxor-ferroelectric material is about $0.93BT$-$0.07BiYbO_3$ ($0.93BT$-$0.07BY$)). A fifth graph 25G5 shows the result when the solid solution concentration of the fourth relaxor-ferroelectric material is about 8 mol % (e.g., the composition of the fourth relaxor-ferroelectric material is about 0.92BT-0.08BY). A sixth graph 25G6 shows the result when the solid solution concentration of the fifth relaxor-ferroelectric material is about 7 mol % (e.g., the composition of the fifth relaxor-ferroelectric material is about 0.93BT-0.07BiLuO$_3$ (0.93BT-0.07BL)). A seventh graph 25G7 shows the result when the solid solution concentration of the fifth relaxor-ferroelectric material is about 8 mol % (e.g., the composition of the fifth relaxor-ferroelectric material is about 0.92BT-0.08BL).

Upon comparing the first to seventh graphs 25G1 to 25G7 of FIG. 25, the peaks of the third to fifth relaxor-ferroelectric materials (the second to seventh graphs 25G2 to 25G7) and the peak of BTO (the first graph 25G1) are generally the same throughout. This suggests that all of the third to fifth relaxor-ferroelectric materials share the same single phase as BTO.

However, referring to FIG. 26, the (002) peak appears in the first graph 25G1 in a low angle region but does not appear in the second to seventh graphs 25G2 to 25G7.

Similarly, referring to FIG. 27, the peak (004) appears in the first graph 25G1 in a high angle region but does not appear in the second to seventh graphs 25G2 to 25G7.

The results of FIGS. 26 and 27 suggest that the third to fifth relaxor-ferroelectric materials also have a pseudo-cubic phase, as in the second relaxor-ferroelectric material.

Figure 28:
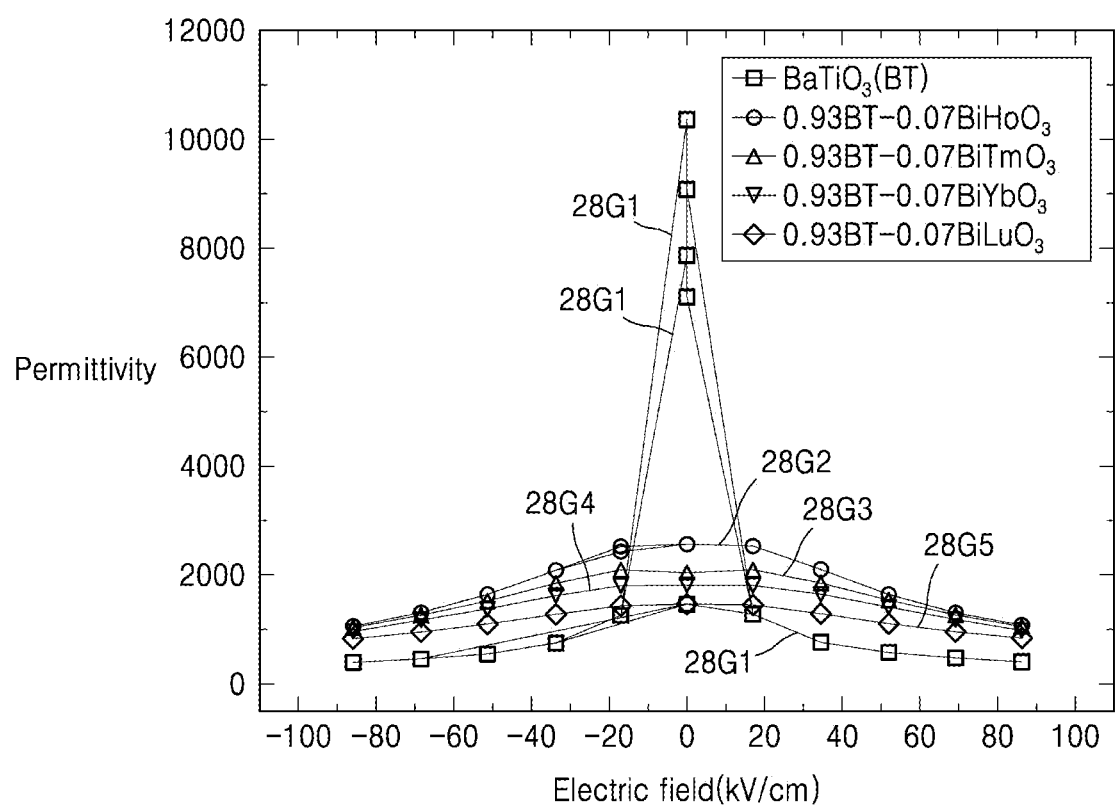
FIG. 28 is a graph showing permittivity-electric field characteristics of each of the second to fifth relaxor-ferroelectric materials when each of solid solution concentrations of the second to fifth relaxor-ferroelectric materials used to obtain the XRD analysis result of FIGS. 17 and 25 is 7 mol %.

FIG. 28 is a graph showing permittivity-electric field characteristics of solid solution with concentrations of the second to fifth relaxor-ferroelectric materials used to obtain the XRD analysis result of FIGS. 17 and 25 is about 7 mol %.

Figure 29:
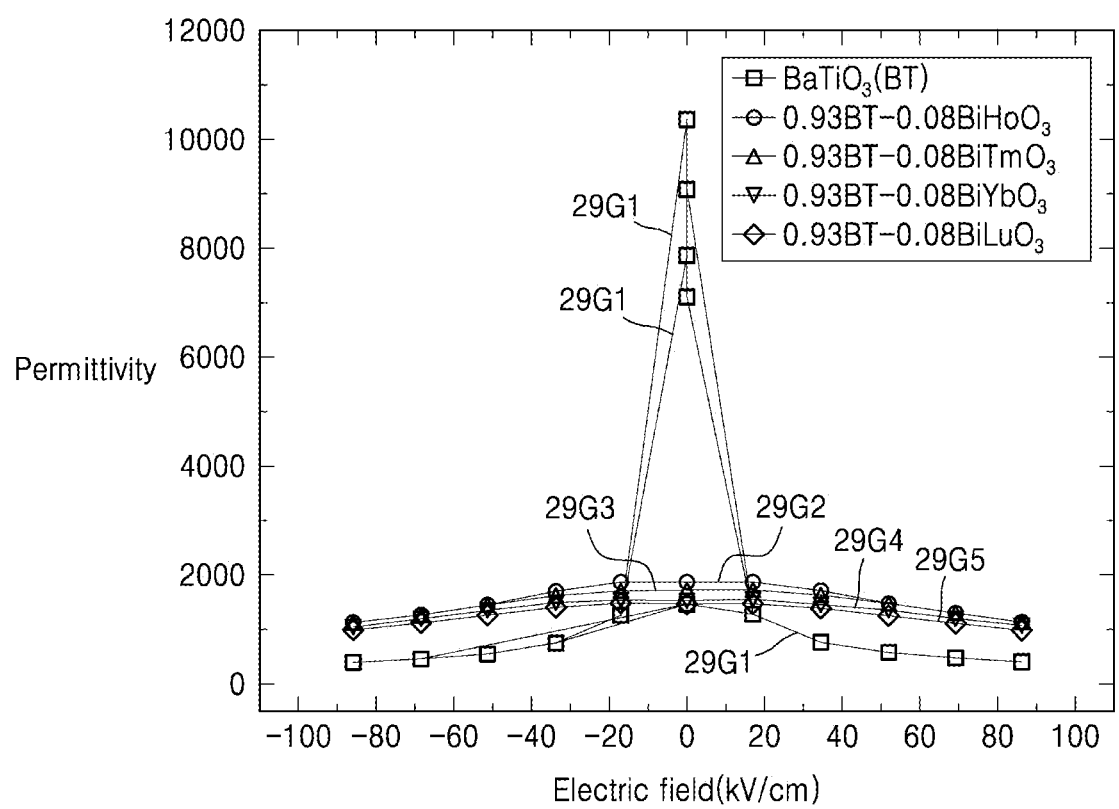
FIG. 29 is a graph showing permittivity-electric field characteristics of each of the second to fifth relaxor-ferroelectric materials when each of the solid solution concentration of the second to fifth relaxor-ferroelectric materials used to obtain the XRD analysis result of FIGS. 17 and 25 is 8 mol %.

In FIGS. 28 and 29, the horizontal axis represents the electric field, and the vertical axis represents the permittivity.

In FIG. 28, a first graph 28G1 shows a change in the permittivity of BTO having no solid solution concentration when the electric field changes between −87 kV/cm and +87 kV/cm. A second graph 28G2 shows a change in the permittivity when the electric field changes between −87 kV/cm and +87 kV/cm, and the solid solution concentration of the third relaxor-ferroelectric material BT-BH is about 7 mol %. A third graph 28G3 shows a change in the permittivity when the electric field changes between −87 kV/cm and +87 kV/cm, and the solid solution concentration of the second relaxor-ferroelectric material BT-BT' is about 7 mol %. A fourth graph 28G4 shows a change in the permittivity when the electric field changes between −87 kV/cm and +87 kV/cm, and the solid solution concentration of the fourth relaxor-ferroelectric material BT-BY is about 7 mol %. A fifth graph 28G5 shows a change in the permittivity when the electric field changes between −87 kV/cm and +87 kV/cm, and the solid solution concentration of the fifth relaxor-ferroelectric material BT-BL is about 7 mol %.

FIG. 29 is a graph showing permittivity-electric field characteristics of each relaxor-ferroelectric material when solid solution with concentrations of the second to fifth relaxor-ferroelectric materials used to obtain the XRD analysis result of FIGS. 17 and 25 is about 8 mol %.

In FIG. 29, a first graph 29G1 shows a change in the permittivity of BTO having no solid solution concentration when the electric field changes between −87 kV/cm and +87 kV/cm. A second graph 29G2 shows a change in the permittivity when the electric field changes between −87 kV/cm and +87 kV/cm, and the solid solution concentration of the third relaxor-ferroelectric material BT-BH is about 8 mol %. A third graph 29G3 shows a change in the permittivity when the electric field changes between −87 kV/cm and +87 kV/cm, and the solid solution concentration of the second relaxor-ferroelectric material BT-BT' is about 8 mol %. A fourth graph 29G4 shows a change in the permittivity when the electric field changes between −87 kV/cm and +87 kV/cm, and the solid solution concentration of the fourth relaxor-ferroelectric material BT-BY is about 8 mol %. A fifth graph 29G5 shows a change in the permittivity when the electric field changes between −87 kV/cm and +87 kV/cm, and the solid solution concentration of the fifth relaxor-ferroelectric material BT-BL is about 8 mol %.

Upon comparing FIGS. 28 and 29, it may be seen in the case of BTO (e.g., the first graph 28G1) that the permittivity rapidly decreases as the electric field increases from 0 to 87 kV/cm. Such a change suggests that polarization is fixed under a high electric field.

Meanwhile, in the case of the second to fifth relaxor-ferroelectric materials (the second to fifth graphs 28G2 to 28G5 and 29G2 to 29G5), the decrease in permittivity is less than that of BTO as the electric field increases, and the effective permittivity also increases as the solid solution concentration of the same relaxor-ferroelectric material increases (from about 7 mol % to about 8 mol %).

Figure 30:
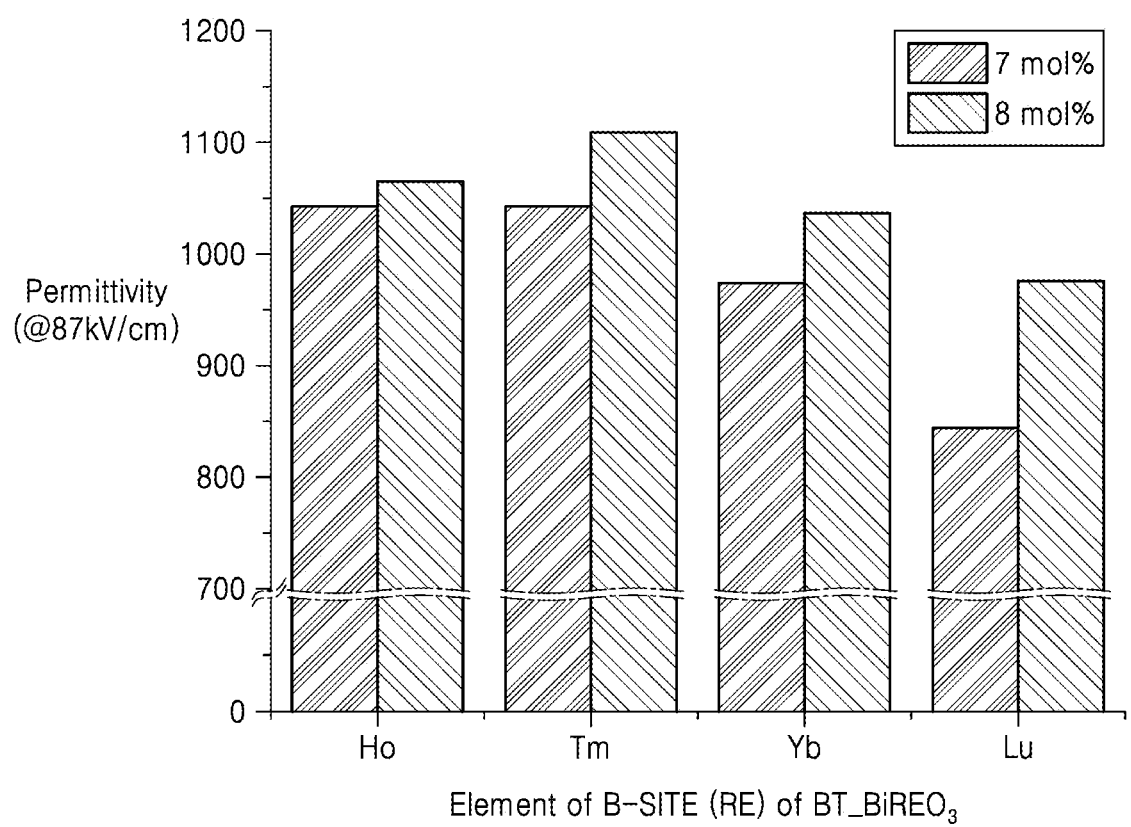
FIG. 30 is a graph showing the permittivity of each of the second to fifth relaxor-ferroelectric materials under a specific electric field (87 kV/cm) when the solid solution concentration of the second relaxor-ferroelectric material used to obtain the XRD analysis result of FIG. 17 and the solid solution concentration of the third to fifth relaxor-ferroelectric materials used to obtain the XRD analysis result of FIG. 25 are 7 mol % and 8 mol %, respectively.

FIG. 30 is a graph showing the permittivity of each relaxor-ferroelectric material under a specific high electric field (87 kV/cm) when the solid solution concentration of the second relaxor-ferroelectric material used to obtain the XRD analysis result of FIG. 17 and the solid solution concentration of the third to fifth relaxor-ferroelectric materials used to obtain the XRD analysis result of FIG. 25 are about 7 mol % and about 8 mol %.

Referring to FIG. 30, when the solid solution concentration is about 7 mol % and about 8 mol %, in the case where RE such as Ho, Tm, Yb, and Lu is present in the B-site of the solid solution, the effective permittivity under the high electric field of 87 kV/cm is greater than an effective permittivity 400 of the BTO. In addition, the effective permittivity of the second to fourth relaxor-ferroelectric materials having the solid solution concentration of about 7 mol % and the effective permittivity of the second to fifth relaxor-ferroelectric materials having the solid solution concentration of about 8 mol % are 900 or more. Further, in the case of the second to fifth relaxor-ferroelectric materials, the effective permittivity tends to increase as the radius of ions located at the B-site of the solid solution increases, regardless of the solid solution concentration. In other words, the effective permittivity tends to increase in the order of the fifth relaxor-ferroelectric material, the fourth relaxor-ferroelectric material, the second relaxor-ferroelectric material, and the third relaxor-ferroelectric material.

Figure 31:
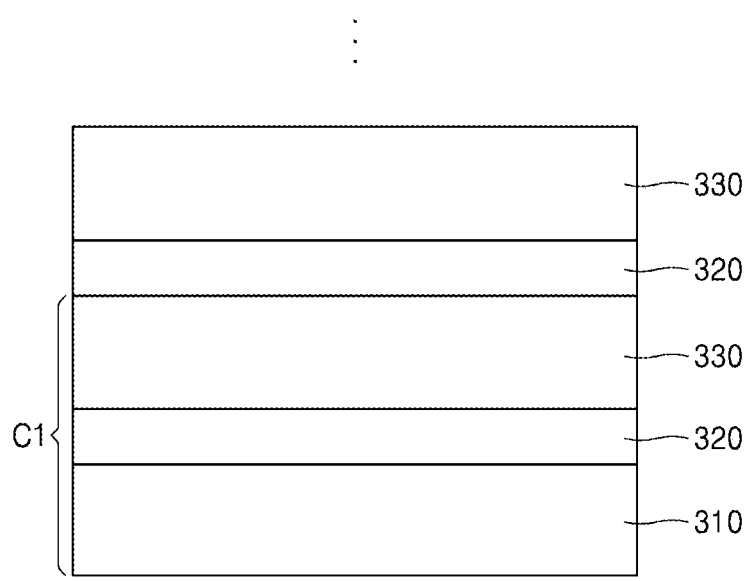
FIG. 31 is a diagram showing a capacitor including a relaxor-ferroelectric material as a dielectric layer according to some example embodiment.

FIG. 31 is a diagram showing a capacitor C1 as an example of a device including a relaxor-ferroelectric material according to an example embodiment.

Referring to FIG. 31, the capacitor C1 according to an example embodiment, includes a first electrode 310, a dielectric layer 320, and a second electrode 330 sequentially stacked. One of the first and second electrodes 310 and 330 may be a lower electrode, and the other may be an upper electrode. The dielectric layer 320 may be the relaxor-ferroelectric material according to the above-described example embodiment or may include the relaxor-ferroelectric material. The capacitor C1 may be a unit capacitor, and thus a plurality of capacitors may be stacked on the capacitor C1. As an example, the dielectric layer 320 and the second electrodes 330 may be alternately and repeatedly stacked on the first electrode 310 in a vertical direction. As a result, a multilayer ceramic capacitor (MLCC) may be formed.

Figure 32:
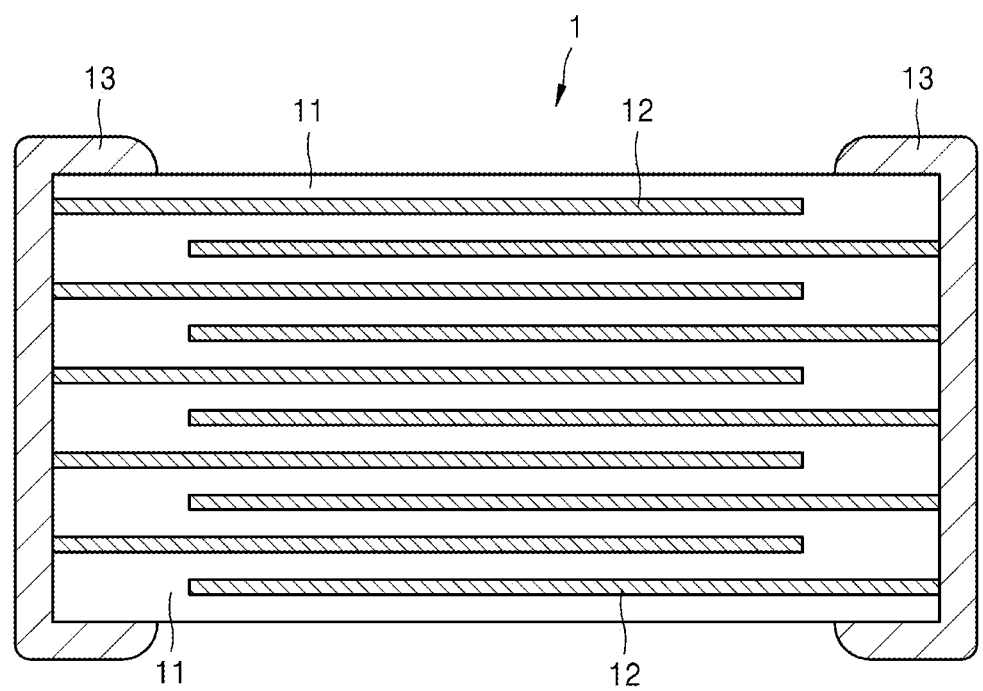
FIG. 32 illustrates a circuit configuration of a memory cell of a memory device including a semiconductor device and a capacitor.

Referring to FIG. 32, the multi-layer capacitor 1 according to some example embodiments may include a plurality of internal electrodes 12, and a dielectric material layer 11 alternately disposed between the plurality of internal electrodes 12. The multi-layer capacitor 1 may have a structure in which the plurality of internal electrodes 12 and the dielectric material layer 11 are alternately stacked, and the dielectric material layer 11 may include the relaxor-ferroelectric materials according to one or more embodiments. The adjacent internal electrodes 12 may be electrically separated from one another by the dielectric material layer 11 therebetween. In the multi-layer capacitor 1, the number of the internal electrodes 12 and the number of the dielectric material layers 11, which are alternately stacked, may each independently be, for example, 2 or greater, 5 or greater, 10 or greater, 20 or greater, 50 or greater, 100 or greater, 200 or greater, 500 or greater, 1,000 or greater, 2,000 or greater, 5,000 or greater, and/or 10,000 or greater. The multi-layer capacitor 1 may provide capacitance through the stacked structure in which the plurality of unit capacitors is stacked. As the number of the stacked internal electrodes 12 and the dielectric material layer 11 increases, a contact area thereof may increase, thus improving the capacitance. The internal electrodes 12 may be disposed to have an area smaller than the area of the dielectric material layer 11. The plurality of the internal electrodes 12 may each have an identical area; however, the adjacent internal electrodes 12 may be disposed not to be in the same position along the thickness direction of the multi-layer capacitor 1, and to partially protrude alternately in the directions of the opposing side surfaces of the multi-layer capacitor 1.

The internal electrodes 12 may be formed, for example, by placing conductive plates between the dielectric material layers and/or using a conductive paste including a conductive material, for example at least one of nickel (Ni), copper (Cu), palladium (Pd), a palladium-silver (Pd—Ag) alloy, and/or the like. A printing method may be used to deposit the conductive paste. For example, the printing method may be a screen printing method and/or a gravure printing method, but is not necessarily limited thereto, and any method of forming internal electrodes, the method being used in the art, may be used. The internal electrodes 12 may have a thickness of, for example, 100 nm to 5 µm, 100 nm to 2.5 µm, 100 nm to 1 µm, 100 nm to 800 nm, 100 nm to 400 nm, and/or 100 nm to 200 nm.

The plurality of the internal electrodes 12, which are alternately stacked to partially protrude from opposing side surfaces of the multi-layered capacitor 1, may be electrically connected to external electrodes 13. The external electrodes 13 may be, for example, on a laminate structure including the dielectric material layer 11 alternately disposed between the plurality of the internal electrodes 12, and connected to the internal electrodes 12. The multi-layer capacitor 1 may include the internal electrodes 12, and external electrodes 13 respectively connected to the internal electrodes 12. The multi-layer capacitor 1 may include, for example, a pair of external electrodes 13 surrounding the opposite sides of a laminate structure including the internal electrodes 12 and the dielectric material layer 11. The external electrodes 13 may be any material having electrical conductivity, such as metal, or may be a specific material, which may be determined considering electrical characteristics, structural stability, and the like. The external electrodes 13 may have, for example, a multi-layer structure. The external electrodes 13 may include, for example, an electrode layer contacting the laminate and the internal electrodes 12 and comprising Ni and/or a plating layer on the electrode layer.

The dielectric material layers 11 in the multi-layer capacitor 1 may, for example, have a larger cross-sectional area than the cross-sectional area of the adjacent internal electrodes 12. The dielectric material layer 11 between the adjacent internal electrodes 12 in the multi-layer capacitor 1 may be connected to each other. The dielectric material layer 11 between the adjacent internal electrodes 12 may be connected to one another at the sides of the multi-layer capacitor 1, and may be in contact with the external electrodes 13 in the multi-layer capacitor 1. In some example embodiments, the external electrodes 13 may be omitted. When the external electrodes 13 are omitted, the internal electrodes 12 protruding to the opposing sides of the multi-layer capacitor 1 may be connected to a power source.

In a unit capacitor including the adjacent internal electrodes 12 and the dielectric material layers 11 disposed therebetween, a thickness of the dielectric material layer 11 (e.g., a gap between the adjacent internal electrodes 12) may be, for example, 10 nm to 1 µm, 100 nm to 800 nm, 100 nm to 600 nm, and/or 100 nm to 300 nm.

By the inclusion of the dielectric material layer 11 having such a small thickness and high permittivity, the multi-layer capacitor 1 may have improved capacitance and have reduced thickness and volume. Accordingly, a smaller, thinner capacitor with higher capacity may be provided.

The relaxor-ferroelectric material includes a ferroelectric material having a first polarization characteristic, and the ferroelectric material includes a plurality of regions that are spaced apart from each other and having a second polarization characteristic different from the first polarization characteristic. The energy barrier of the region having the second polarization characteristic with respect to AC sweeping is smaller than that of the ferroelectric material having the first polarization characteristic. Therefore, the relaxor-ferroelectric material may maintain the ferroelectric characteristic which may be encountered in a process of high integration and miniaturization, even under a high electric field in which the first polarization characteristic is deteriorated, and may obtain much more stable TCC than the conventional ferroelectric material (e.g., BTO). Due to this characteristic, the ferroelectric material may be variously applied as piezoelectric actuators, multi-layer capacitors for antennas, dielectrics of nonvolatile memory devices, etc.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A relaxor-ferroelectric material comprising:
   a plurality of domains separated by boundaries, each of the plurality of domains comprising a ferroelectric material having a first polarization characteristic; and
   a plurality of regions in each of the plurality of domains such that the plurality of regions are spaced apart from each other and at least one of the plurality of regions is spaced apart from the boundaries, the plurality of regions having a second polarization characteristic different from the first polarization characteristic.

2. The relaxor-ferroelectric material of claim 1, wherein the ferroelectric material having the first polarization characteristic and the plurality of regions have different response characteristics with respect to alternating current (AC) sweeping.

3. The relaxor-ferroelectric material of claim 1, wherein the plurality of regions comprise a solid solution.

4. The relaxor-ferroelectric material of claim 1, wherein each of the plurality of regions comprises a donor and an acceptor.

5. The relaxor-ferroelectric material of claim 1, wherein the ferroelectric material having the first polarization characteristic comprises the plurality of regions and only the second polarization characteristic appears under a high direct current (DC) electric field.

6. The relaxor-ferroelectric material of claim 2, wherein only the plurality of regions respond to the AC sweeping under a high DC electric field and follow the AC sweeping.

7. The relaxor-ferroelectric material of claim 3, wherein a concentration of the solid solution is about 5 mol % to about 20 mol % a substitute composition.

8. The relaxor-ferroelectric material of claim 3, wherein a concentration of the solid solution is about 5 mol % to about 10 mol % a substitute composition.

9. The relaxor-ferroelectric material of claim 3, wherein the plurality of regions comprise a material having a chemical equation of $ABO_3$, and
wherein an ion radius of A is greater than an ion radius of B.

10. The relaxor-ferroelectric material of claim 9, wherein an amount of A is the same as an amount of B in the plurality of regions.

11. The relaxor-ferroelectric material of claim 9, wherein A is at least one of Bi and La.

12. The relaxor-ferroelectric material of claim 9, wherein B is a lanthanide element.

13. The relaxor-ferroelectric material of claim 12, wherein B is one of Pr, Nd, Sm, Eu, Gd, Tb, Dy, Ho, Er, Tm, Yb, and Lu.

14. A capacitor comprising:
a first electrode;
a second electrode facing the first electrode; and
a dielectric layer comprises the relaxor-ferroelectric material of claim 1 between the first electrode and the second electrode.

15. The capacitor of claim 14, wherein when the first electrode, the dielectric layer, and the second electrode are sequentially stacked, the dielectric layer and the second electrode are alternately stacked on the first electrode.

16. A method of synthesizing of a relaxor-ferroelectric materials, the method comprising:
quantifying a first raw material comprising a composition of the relaxor-ferroelectric material having a first polarization characteristic in the relaxor-ferroelectric material;
quantifying a second raw material comprising a composition of a material that has a second polarization characteristic different from the first polarization characteristic in the relaxor-ferroelectric material;
mixing the first raw material and the second raw material; and
performing a processing according to a solid-state reaction such that a plurality of regions including the material that has the second polarization characteristic form in domains comprising the relaxor-ferroelectric material having the first polarization characteristic,
wherein at least one of the plurality of regions is spaced apart from boundaries between domains of the relaxor-ferroelectric material.

17. The method of claim 16, wherein the material having the second polarization characteristic is a solid solution in the relaxor-ferroelectric material.

18. The method of claim 17, wherein a concentration of the solid solution is about 5 mol % to about 10 mol % a substitute composition.

19. The method of claim 16, wherein the material having the second polarization characteristic comprises a substitute composition having a chemical equation of $ABO_3$, and
wherein an ion radius of A is greater than an ion radius of B.

20. The method of claim 19, wherein an amount of A is the same as an amount of B.

21. The method of claim 19, wherein the second raw material comprises A as $A_2O_3$ and B as $B_2O_3$.

22. The method of claim 19, wherein A is at least one of Bi and La, and B is a lanthanide element.

* * * * *